United States Patent
Loheide et al.

(10) Patent No.: US 10,965,720 B2
(45) Date of Patent: Mar. 30, 2021

(54) SYSTEM FOR ESTABLISHING A SHARED MEDIA SESSION FOR ONE OR MORE CLIENT DEVICES

(71) Applicant: Turner Broadcasting Systems, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US); Joel Middendorf, Alpharetta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 42 days.

(21) Appl. No.: 16/236,713

(22) Filed: Dec. 31, 2018

(65) Prior Publication Data
US 2019/0141089 A1 May 9, 2019

Related U.S. Application Data

(60) Provisional application No. 62/699,131, filed on Jul. 17, 2018.

(51) Int. Cl.
*H04L 29/06* (2006.01)
*H04N 21/43* (2011.01)
(Continued)

(52) U.S. Cl.
CPC ...... *H04L 65/1069* (2013.01); *H04L 65/1089* (2013.01); *H04L 65/1093* (2013.01);
(Continued)

(58) Field of Classification Search
CPC .............. H04L 65/608; H04L 65/1089; H04L 65/1069; H04L 65/1093; H04L 65/4076;
(Continued)

(56) References Cited

U.S. PATENT DOCUMENTS

| 3,751,581 A | 8/1973 | Sakata et al. |
| 4,500,930 A | 2/1985 | Hamalainen et al. |

(Continued)

OTHER PUBLICATIONS

Advisory Action for U.S. Appl. No. 15/396,475 dated Jun. 3, 2019.
(Continued)

*Primary Examiner* — Chenea Davis
(74) *Attorney, Agent, or Firm* — Chip Law Group

(57) ABSTRACT

A system is provided for establishing a shared media session for one or more client devices. One or more processors in the system are configured to establish a shared media session that includes a disparate live media output stream scheduled by a first client device to start at a defined timestamp, and played back on one of the first client device or a plurality of client devices that join the shared media session through a distributed communication network. A persistent record of event data and media, synchronized based on one or more criteria and received from a recording client device, is generated corresponding to the shared media session and previous shared media sessions until the shared media session is terminated by at least one of the first client device or by abandonment of the distributed communication network by the plurality of client devices.

63 Claims, 7 Drawing Sheets

(51) Int. Cl.
*H04N 21/2668* (2011.01)
*H04N 21/2187* (2011.01)

(52) U.S. Cl.
CPC ........ *H04L 65/4076* (2013.01); *H04L 65/608* (2013.01); *H04N 21/2187* (2013.01); *H04N 21/2668* (2013.01); *H04N 21/4307* (2013.01)

(58) Field of Classification Search
CPC .. H04N 21/2668; H04N 9/8205; H04N 7/155; H04N 21/242; H04N 5/76; H04N 21/4307; H04N 21/2187
See application file for complete search history.

(56) References Cited

U.S. PATENT DOCUMENTS

| | | |
|---|---|---|
| 5,294,981 A | 3/1994 | Yazolino et al. |
| 6,229,524 B1 | 5/2001 | Chernock et al. |
| 6,378,129 B1 | 4/2002 | Zetts |
| 6,434,621 B1 | 8/2002 | Pezzillo et al. |
| 6,625,811 B1 | 9/2003 | Kaneko |
| 6,701,355 B1 | 3/2004 | Brandt et al. |
| 6,727,914 B1 | 4/2004 | Gutta |
| 7,051,352 B1 | 5/2006 | Schaffer |
| 7,337,458 B2 | 2/2008 | Michelitsch et al. |
| 7,380,262 B2 | 5/2008 | Wang et al. |
| 7,581,237 B1 | 8/2009 | Kurapati |
| 7,840,980 B2 | 11/2010 | Gutta |
| 7,985,134 B2 | 7/2011 | Ellis |
| 8,005,826 B1 | 8/2011 | Sahami et al. |
| 8,099,757 B2 | 1/2012 | Riedl et al. |
| 8,132,203 B2 | 3/2012 | Heer |
| 8,533,761 B2 | 9/2013 | Sahami et al. |
| 8,572,649 B1 | 10/2013 | Gossweiler et al. |
| 8,578,042 B2 | 11/2013 | Hu et al. |
| 8,631,440 B2 | 1/2014 | Gossweiler et al. |
| 8,826,443 B1 | 9/2014 | Raman et al. |
| 8,842,879 B2 | 9/2014 | Laksono et al. |
| 8,843,965 B1 | 9/2014 | Kurapati et al. |
| 8,954,521 B1 | 2/2015 | Faaborg et al. |
| 9,094,639 B2 | 7/2015 | Yim et al. |
| 9,130,918 B2 | 9/2015 | Picconi et al. |
| 9,342,668 B2 | 5/2016 | Wang et al. |
| 9,380,264 B1 * | 6/2016 | Vakalapudi ............ H04N 7/147 |
| 9,390,447 B1 | 7/2016 | Smith |
| 10,075,753 B2 | 9/2018 | Loheide et al. |
| 2002/0038457 A1 | 3/2002 | Numata et al. |
| 2002/0178447 A1 | 11/2002 | Plotnick et al. |
| 2003/0023757 A1 | 1/2003 | Ishioka et al. |
| 2003/0026628 A1 | 2/2003 | Arimoto |
| 2003/0051239 A1 | 3/2003 | Hudspeth |
| 2003/0110507 A1 | 6/2003 | Dimitrova et al. |
| 2003/0126600 A1 | 7/2003 | Heuvelman |
| 2003/0151538 A1 | 8/2003 | Escobosa et al. |
| 2003/0182658 A1 | 9/2003 | Alexander |
| 2003/0212708 A1 | 11/2003 | Potrebic et al. |
| 2003/0236832 A1 | 12/2003 | McIntyre et al. |
| 2004/0022278 A1 | 2/2004 | Thomas et al. |
| 2004/0031056 A1 | 2/2004 | Wolff |
| 2004/0128682 A1 | 7/2004 | Liga et al. |
| 2004/0163103 A1 | 8/2004 | Swix et al. |
| 2004/0172650 A1 | 9/2004 | Hawkins et al. |
| 2005/0015816 A1 | 1/2005 | Christofalo et al. |
| 2005/0060745 A1 | 3/2005 | Riedl et al. |
| 2005/0096978 A1 | 5/2005 | Black |
| 2005/0120369 A1 | 6/2005 | Matz |
| 2005/0132401 A1 | 6/2005 | Boccon-Gibod et al. |
| 2005/0135613 A1 | 6/2005 | Brandenburg et al. |
| 2006/0031889 A1 | 2/2006 | Bennett et al. |
| 2006/0064730 A1 | 3/2006 | Rael et al. |
| 2006/0122916 A1 | 6/2006 | Kassan |
| 2006/0287915 A1 | 12/2006 | Boulet et al. |
| 2007/0011718 A1 | 1/2007 | Nee |
| 2007/0033419 A1 | 2/2007 | Kocher et al. |
| 2007/0186228 A1 | 8/2007 | Ramaswamy et al. |
| 2007/0238035 A1 | 10/2007 | Holscher et al. |
| 2007/0250901 A1 | 10/2007 | McIntire et al. |
| 2008/0086742 A1 | 4/2008 | Aldrey et al. |
| 2008/0201735 A1 | 8/2008 | Sumiyoshi et al. |
| 2008/0271078 A1 | 10/2008 | Gossweiler et al. |
| 2008/0271080 A1 | 10/2008 | Gossweiler et al. |
| 2008/0320513 A1 | 12/2008 | Wong et al. |
| 2009/0070808 A1 | 3/2009 | Jacobs |
| 2009/0070819 A1 | 3/2009 | Gajda et al. |
| 2009/0100452 A1 | 4/2009 | Hudgeons et al. |
| 2009/0254934 A1 | 10/2009 | Grammens |
| 2009/0256972 A1 | 10/2009 | Ramaswamy et al. |
| 2009/0285217 A1 | 11/2009 | Frink et al. |
| 2009/0287790 A1 * | 11/2009 | Upton ................ H04N 7/17318 709/208 |
| 2010/0010899 A1 | 1/2010 | Lambert et al. |
| 2010/0125880 A1 | 5/2010 | Roewe |
| 2010/0146548 A1 | 6/2010 | Yim et al. |
| 2010/0146559 A1 | 6/2010 | Lee et al. |
| 2010/0169914 A1 | 7/2010 | Williamson et al. |
| 2010/0287297 A1 | 11/2010 | Lefebvre |
| 2010/0325655 A1 | 12/2010 | Perez |
| 2010/0325657 A1 | 12/2010 | Sellers et al. |
| 2011/0022471 A1 | 1/2011 | Brueck et al. |
| 2011/0052144 A1 | 3/2011 | Abbas et al. |
| 2011/0123062 A1 | 5/2011 | Hilu |
| 2011/0153464 A1 | 6/2011 | Hendricks et al. |
| 2011/0161500 A1 | 6/2011 | Yengalasetti et al. |
| 2011/0164115 A1 | 7/2011 | Bennett et al. |
| 2011/0177775 A1 | 7/2011 | Gupta et al. |
| 2011/0209181 A1 | 8/2011 | Gupta et al. |
| 2011/0238754 A1 | 9/2011 | Dasilva et al. |
| 2011/0246202 A1 | 10/2011 | McMillan et al. |
| 2012/0017282 A1 | 1/2012 | Kang et al. |
| 2012/0110621 A1 | 5/2012 | Gossweiler |
| 2012/0143693 A1 | 6/2012 | Chung et al. |
| 2012/0192232 A1 | 7/2012 | Ellis |
| 2012/0271942 A1 * | 10/2012 | Walker .................. H04L 41/069 709/224 |
| 2012/0272264 A1 | 10/2012 | Suzuki et al. |
| 2012/0284737 A1 | 11/2012 | Savoor et al. |
| 2012/0304223 A1 | 11/2012 | Sargent et al. |
| 2013/0121487 A1 | 5/2013 | Lorberbaum et al. |
| 2013/0160051 A1 | 6/2013 | Armstrong et al. |
| 2013/0198328 A1 | 8/2013 | Green et al. |
| 2013/0205212 A1 | 8/2013 | Sinha et al. |
| 2013/0208811 A1 | 8/2013 | Liu et al. |
| 2013/0227283 A1 | 8/2013 | Williamson et al. |
| 2013/0227284 A1 | 8/2013 | Pfeffer et al. |
| 2013/0263168 A1 | 10/2013 | Choi |
| 2013/0263182 A1 | 10/2013 | Ivy et al. |
| 2013/0276023 A1 | 10/2013 | Kent et al. |
| 2013/0305287 A1 | 11/2013 | Wong et al. |
| 2013/0312041 A1 | 11/2013 | Gresta |
| 2013/0325605 A1 | 12/2013 | Callaghan et al. |
| 2014/0013354 A1 | 1/2014 | Johnson et al. |
| 2014/0020017 A1 | 1/2014 | Stern et al. |
| 2014/0032259 A1 | 1/2014 | LaFever et al. |
| 2014/0033240 A1 | 1/2014 | Card |
| 2014/0071818 A1 | 3/2014 | Wang et al. |
| 2014/0143806 A1 | 5/2014 | Steinberg et al. |
| 2014/0150019 A1 | 5/2014 | Ma et al. |
| 2014/0152894 A1 | 6/2014 | Childs et al. |
| 2014/0157312 A1 | 6/2014 | Williams et al. |
| 2014/0173666 A1 | 6/2014 | Gordon et al. |
| 2014/0189514 A1 | 7/2014 | Hilliard |
| 2014/0189743 A1 | 7/2014 | Kennedy et al. |
| 2014/0189754 A1 | 7/2014 | Major et al. |
| 2014/0237243 A1 | 8/2014 | Ma et al. |
| 2014/0282723 A1 | 9/2014 | Sinha et al. |
| 2014/0310745 A1 | 10/2014 | Canney et al. |
| 2014/0317666 A1 | 10/2014 | Chiarulli et al. |
| 2014/0351843 A1 | 11/2014 | Theriault |
| 2014/0359656 A1 | 12/2014 | Banica et al. |
| 2014/0366068 A1 | 12/2014 | Burkitt et al. |
| 2015/0012926 A1 | 1/2015 | Wei et al. |
| 2015/0033255 A1 | 1/2015 | Neumann et al. |
| 2015/0058874 A1 | 2/2015 | Sun et al. |
| 2015/0074732 A1 | 3/2015 | Green et al. |

(56) References Cited

U.S. PATENT DOCUMENTS

| | | | |
|---|---|---|---|
| 2015/0106856 | A1 | 4/2015 | Rankine |
| 2015/0127845 | A1 | 5/2015 | Phillips et al. |
| 2015/0237386 | A1 | 8/2015 | Sheehan et al. |
| 2015/0237389 | A1 | 8/2015 | Grouf et al. |
| 2015/0249865 | A1 | 9/2015 | Oliveira |
| 2015/0271234 | A1 | 9/2015 | O'Malley et al. |
| 2015/0289022 | A1 | 10/2015 | Gross |
| 2015/0382042 | A1 | 12/2015 | Wagenaar et al. |
| 2015/0382047 | A1 | 12/2015 | Os et al. |
| 2015/0382274 | A1 | 12/2015 | Logvinov et al. |
| 2016/0029055 | A1 | 1/2016 | Nunez et al. |
| 2016/0063530 | A1 | 3/2016 | Lin |
| 2016/0073155 | A1 | 3/2016 | Subramaniam et al. |
| 2016/0112740 | A1 | 4/2016 | Francisco et al. |
| 2016/0127786 | A1 | 5/2016 | Langer |
| 2016/0127788 | A1 | 5/2016 | Roberts et al. |
| 2016/0182954 | A1 | 6/2016 | Nguyen et al. |
| 2016/0198202 | A1 | 7/2016 | Brandenburg et al. |
| 2016/0227260 | A1 | 8/2016 | Hundemer et al. |
| 2016/0255391 | A1 | 9/2016 | Noble |
| 2016/0308958 | A1 | 10/2016 | Navali et al. |
| 2016/0316247 | A1 | 10/2016 | Biagini et al. |
| 2017/0064400 | A1 | 3/2017 | Riegel et al. |
| 2017/0070789 | A1 | 3/2017 | Liassides et al. |
| 2017/0085935 | A1 | 3/2017 | Riedel et al. |
| 2017/0099506 | A1 | 4/2017 | Grover |
| 2017/0099525 | A1 | 4/2017 | Ray et al. |
| 2017/0171610 | A1 | 6/2017 | Nair et al. |
| 2017/0193544 | A1 | 7/2017 | Glasgow et al. |
| 2017/0195718 | A1 | 7/2017 | Nair et al. |
| 2017/0201779 | A1 | 7/2017 | Publicover et al. |
| 2017/0238035 | A1 | 8/2017 | Perez |
| 2017/0289597 | A1 | 10/2017 | Riedel et al. |
| 2018/0007060 | A1 | 1/2018 | Leblang et al. |
| 2018/0048599 | A1 | 2/2018 | Arghandiwal et al. |
| 2018/0131986 | A1 | 5/2018 | Cole et al. |
| 2018/0165650 | A1* | 6/2018 | Kashyape ...... G06Q 10/063112 |
| 2018/0184047 | A1* | 6/2018 | Simonsen ........... H04L 65/4038 |
| 2018/0300751 | A1 | 10/2018 | Hammitt et al. |
| 2018/0343505 | A1 | 11/2018 | Loheide et al. |
| 2020/0244778 | A1 | 7/2020 | Berookhim et al. |

OTHER PUBLICATIONS

Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance in U.S. Appl. No. 15/396,453 dated Jun 13, 2019.
Final Office Action for U.S. Appl. No. 15/986,218 dated Apr. 24, 2019.
Final Office Action for U.S. Appl. No. 15/988,308 dated May 9, 2019.
Final Office Action in U.S. Appl. No. 15/986,218 dated Apr. 24, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Notice of Allowance for U.S. Appl. No. 15/396,624 dated May 31, 2019.
Advisory Action for U.S. Appl. No. 15/396,614 dated Oct. 24, 2019.
Corrected Notice of Allowance for U.S. Appl. No. 15/396,453 dated Aug. 21, 2019.
Corrected Notice of Allowance for U.S. Appl. No. 15/396,624 dated Sep. 5, 2019.
Final Office Action for U.S. Appl. No. 15/396,468 dated Nov. 6, 2019.
Final Office Action for U.S. Appl. No. 15/396,614 dated Aug. 12, 2019.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 16/128,104 dated Aug. 21, 2019.
Supplemental Notice of Allowance for U.S. Appl. No. 15/396,624 dated Aug. 14, 2019.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,468 dated Mar. 1, 2019.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Advisory Action for U.S. Appl. No. 15/396,468 dated Jan. 16, 2020.
Advisory Action for U.S. Appl. No. 15/986,361 dated Feb. 26, 2020.
Advisory Action for U.S. Appl. No. 15/986,451 dated Feb. 20, 2020.
Final Office Action for U.S. Appl. No. 15/396,475 dated Feb. 4, 2020.
Final Office Action for U.S. Appl. No. 15/986,218 dated Jan. 31, 2020.
Final Office Action for U.S. Appl. No. 15/986,361 dated Dec. 23, 2019.
Final Office Action for U.S. Appl. No. 15/986,451 dated Dec. 16, 2019.
Final Office Action for U.S. Appl. No. 15/988,241 dated Jan. 8, 2020.
Non-Final Office Action for U.S. Appl. No. 15/396,468 dated Feb. 4, 2020.
Non-Final Office Action for U.S. Appl. No. 15/986,406 dated Dec. 18, 2019.

(56) References Cited

OTHER PUBLICATIONS

Non-Final Office Action for U.S. Appl. No. 15/986,286 dated Nov. 29, 2019.
Non-Final Office Action for U.S. Appl. No. 15/988,308 dated Dec. 3, 2019.
Non-Final Office Action for U.S. Appl. No. 15/988,472 dated Dec. 27, 2019.
Non-Final Office Action for U.S. Appl. No. 15/988,492 dated Feb. 18, 2020.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/236,673 dated Jan. 10, 2020.
Notice of Allowance for U.S. Appl. No. 16/128,104 dated Dec. 12, 2019.
Restriction Requirement for U.S. Appl. No. 16/231,467 dated Feb. 5, 2020.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 16/128,104 dated Jul. 8, 2020.
Corrected Notice of Allowance for U.S. Appl. No. 16/236,673 dated Sep. 21, 2020.
Final Office Action for U.S. Appl. No. 15/988,572 dated Jul. 2, 2020.
Final Office Action for U.S. Appl. No. 16/229,614 dated Jul. 9, 2020.
Final Office Action for U.S. Appl. No. 16/234,870 dated Jul. 9, 2020.
Final Office Action for U.S. Appl. No. 16/235,445 dated Sep. 3, 2200.
Non-Final Office Action for U.S. Appl. No. 15/396,475 dated Aug. 6, 2020.
Non-Final Office Action for U.S. Appl. No. 15/988,308 dated Sep. 8, 2020.
Non-Final Office Action for U.S. Appl. No. 15/988,492 dated Sep. 10, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowance for U.S. Appl. No. 15/986,218 dated Jul. 13, 2020.
Notice of Allowance for U.S. Appl. No. 15/988,241 dated Aug. 26, 2020.
Notice of Allowance for U.S. Appl. No. 16/230,268 dated Aug. 24, 2020.
Notice of Allowance for U.S. Appl. No. 16/234,870 dated Aug. 19, 2020.
Advisory Action for U.S. Appl. No. 15/396,475 dated May 13, 2020.
Corrected Notice of Allowance for U.S. Appl. No. 15/988,241 dated May 8, 2020.
Corrected Notice of Allowance for U.S. Appl. No. 16/128,104 dated Apr. 15, 2020.
Corrected Notice of Allowance for U.S. Appl. No. 16/128,104 dated May 20, 2020.
Final Office Action for U.S. Appl. No. 15/988,308 dated May 6, 2020.
Final Office Action for U.S. Appl. No. 15/986,286 dated Jun. 9, 2020.
Final Office Action for U.S. Appl. No. 15/986,406 dated May 26, 2020.
Final Office Action for U.S. Appl. No. 15/988,492 dated May 28, 2020.
Final Office Action for U.S. Appl. No. 16/229,310 dated Jun. 11, 2020.
Final Office Action for U.S. Appl. No. 16/229,497 dated Jun. 11, 2020.
Final Office Action for U.S. Appl. No. 16/230,268 dated Apr. 17, 2020.
Non-Final Office Action for U.S. Appl. No. 15/986,451 dated Apr. 16, 2020.
Non-Final Office Action for U.S. Appl. No. 16/229,614 dated Mar. 19, 2020.
Non-Final Office Action for U.S. Appl. No. 16/235,445 dated Apr. 2, 2020.
Notice of Allowability for U.S. Appl. No. 15/986,361 dated May 15, 2020.
Notice of Allowance for U.S. Appl. No. 15/986,361 dated Apr. 8, 2020.
Notice of Allowance for U.S. Appl. No. 15/988,241 dated Mar. 18, 2020.
Notice of Allowance for U.S. Appl. No. 16/231,467 dated Apr. 16, 2020.
Notice of Allowance in U.S. Appl. No. 16/236,673 dated May 1, 2020.
Corrected Notice of Allowance for U.S. Appl. No. 15/988,241 dated Nov. 18, 2020.
Corrected Notice of Allowance for U.S. Appl. No. 16/230,268 dated Dec. 2, 2020.
Corrected Notice of Allowance for U.S. Appl. No. 16/230,268 dated Oct. 9, 2020.
Corrected Notice of Allowance for U.S. Appl. No. 16/231,467 dated Nov. 20, 2020.
Corrected Notice of Allowance for U.S. Appl. No. 16/231,467 dated Oct. 1, 2020.
Corrected Notice of Allowance for U.S. Appl. No. 16/236,673 dated Oct. 23, 2020.
Final Office Action for U.S. Appl. No. 15/986,451 dated Sep. 29, 2020.
Final Office Action for U.S. Appl. No. 16/236,713 dated Sep. 30, 2020.
Non-Final Office Action for U.S. Appl. No. 15/986,406 dated Oct. 30, 2020.
Non-Final Office Action for U.S. Appl. No. 15/988,572 dated Nov. 6, 2020.
Non-Final Office Action for U.S. Appl. No. 16/902,775 dated Oct. 5, 2020.
Notice of Allowability for U.S. Appl. No. 15/986,361 dated Sep. 30, 2020.
Notice of Allowance for U.S. Appl. No. 16/229,310 dated Dec. 14, 2020.
Votice of Allowance for U.S. Appl. No. 16/235,445 dated Nov. 4, 2020.
Corrected Notice of Allowance for U.S. Appl. No. 16/234,870 dated Jan. 15, 2021.
Final Office Action for U.S. Appl. No. 15/396,468 dated Feb. 10, 2021.
Final Office Action for U.S. Appl. No. 15/988,308 dated Jan. 28, 2021.
Final Office Action for U.S. Appl. No. 15/988,492 dated Jan. 6, 2021.
Notice of Allowance for U.S. Appl. No. 15/396,475 dated Feb. 5, 2021.
Notice of Allowance for U.S. Appl. No. 16/229,497 dated Dec. 30, 2020.
Notice of Allowance for U.S. Appl. No. 16/902,775 dated Feb. 2, 2021.
Supplemental Notice of Allowance for U.S. Appl. No. 15/986,218 dated Jan. 27, 2021.

(56) References Cited

OTHER PUBLICATIONS

Notice of Allowance for U.S. Appl. No. 16/230,493 dated Feb. 12, 2021.

* cited by examiner

SYSTEM FOR ESTABLISHING A SHARED MEDIA SESSION FOR ONE OR MORE CLIENT DEVICES

CROSS-REFERENCE TO RELATED APPLICATIONS/INCORPORATION BY REFERENCE

This Patent Application claims priority to, and the benefit from U.S. Provisional Application Ser. No. 62/699,131, filed Jul. 17, 2018.

This application also makes reference to:
U.S. application Ser. No. 16/234,870, filed on Dec. 28, 2018.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for establishing a shared media session for one or more client devices.

BACKGROUND

Recent advancements in the field of television content packaging and distribution systems have led to a massive development of numerous technologies and broadcasting platforms that are revolutionizing the way client devices access and playout media content. Usually, broadcasting platforms refer to the types of networks that are used to deliver the media content to the consumers. Currently, the broadcasting platforms, such as analog terrestrial broadcast, digital terrestrial broadcast, direct-to-home satellite broadcast, cable, Internet Protocol (IP), and over-the-top television (OTT), compete and strive to increase their appeal by gaining and retaining the audience viewing the media content.

Modern streaming protocols, such as HTTP Live Streaming (HLS) and Dynamic Adaptive Streaming over HTTP (DASH), are implemented to support streaming of various live content services, such as through DIRECTV NOW[SM], SLING TV[SM] and PLAYSTATION™ VUE, to the client devices. Due to dissemination of such modern streaming protocols in the television, radio, and broadcasting sector, it is evident that the success of broadcasting will be dependent on the ability of the network provider to gain access to the content that consumers demand, and to differentiate their offering from that of incumbent broadcasters or find breakthrough modes of media content delivery.

Existing systems that publish live output streams in a content delivery system may require a scheduler or a network operator to create a channel. Accordingly, the amount of control a user may excerpt to influence what programming and non-programming content is shown may be very limited.

Given the trend toward media content distribution, there is required a television content packaging and distribution system that may leverage a system, which provides to the capability for a user, for example, a viewer, to have a more direct impact on the what programming and non-programming content that is shown. This may provide the network provider with the ability to not only provide new channel offerings in a cost-effective manner but also provide enhanced, intelligent, and personalized viewer experience to increase their appeal in order to gain a wider audience and retain the audience viewing the media content.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for establishing a shared media session for one or more client devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for establishing a shared media session for one or more client devices. Various embodiments of the disclosure provide a method and system that not only provide live channel offerings in a cost-effective manner but also provide enhanced, intelligent, and personalized viewer experience to increase their appeal by retaining the audience viewing the media content.

In accordance with various embodiments of the disclosure, a system is provided for establishing a shared media session for one or more client devices. One or more processors in the system may be configured to establish a shared media session. The shared media session may include a disparate live media output stream scheduled by a first client device to start at a defined timestamp. The disparate live media output stream may be played back on one of the first client device or a plurality of client devices that comprises the first client device and one or more second client devices. The plurality of client devices may join the shared media session through the distributed communication network. During the shared media session, event data and media among the plurality of client devices in the shared media session may be synchronized through the distributed communication network based on one or more criteria. The one or more processors in the shared media session system may be further configured to receive the event data and media corresponding to the shared media session and previous shared media sessions from the recording client device communicably coupled to the distributed communication network. The one or more processors in the shared media session system may be further configured to generate a persistent record of received event data and media corresponding to the shared media session and previous shared media sessions until the shared media session is terminated by at least one of the first client device or by abandonment of the distributed communication network by the first client device and by the one or more second client devices.

Figure 1A:
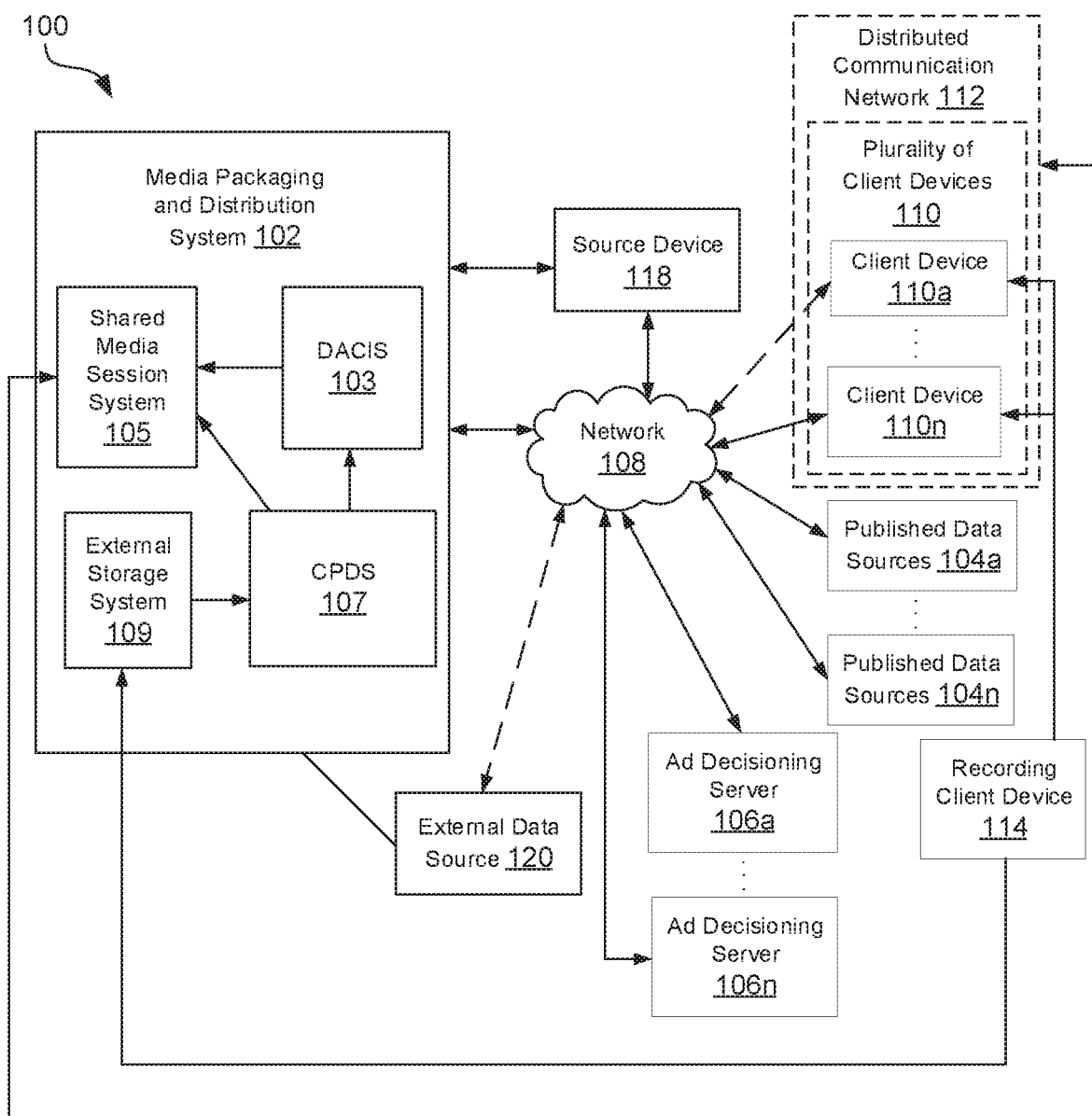
FIGS. 1A and 1B are block diagrams that illustrate an exemplary system for establishing a shared media session for one or more client devices, in accordance with an exemplary embodiment of the disclosure.
Figure 1B:
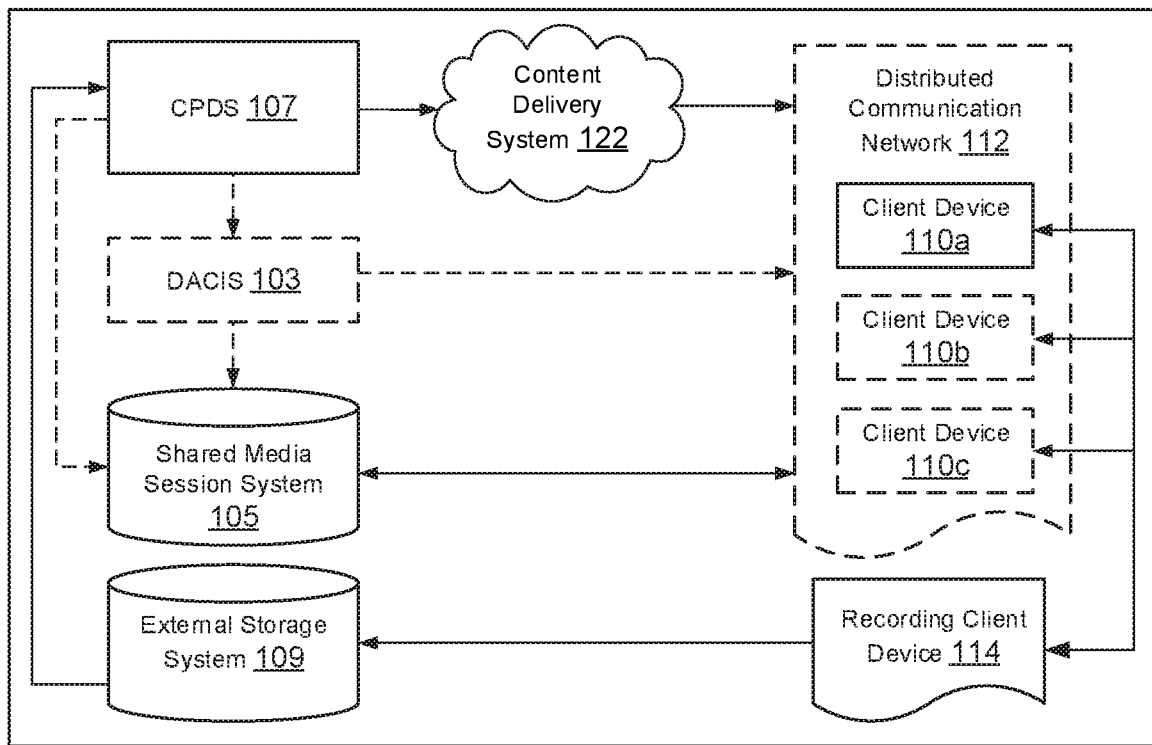

FIGS. 1A and 1B are block diagrams that illustrate an exemplary system for establishing a shared media session for one or more client devices, in accordance with an exemplary embodiment of the disclosure. Referring to FIG. 1A, the system 100, comprises a media packaging and distribution system 102 that is communicatively coupled to published data sources 104a, . . . , 104n, Ad decisioning servers 106a, . . . , 106n, via a network 108 and/or other programmatic means. There are shown a plurality of client devices 110 comprising a first client device 110a and one or more second client devices 110b, . . . , 110n that are communicatively coupled with each other to form a distributed communication network 112, which is further coupled to the network 108. The media packaging and distribution system 102 may comprise a dynamic ad/content insertion system (DACIS) 103, a shared media session system 105, a content packaging and distribution system (CPDS) 107, and an external storage system 109. There are also shown source devices 118 communicatively coupled to the media packaging and distribution system 102 through the network 108. An external data source 120 is also provided, which is communicatively coupled to the media packaging and distribution system 102 through the network 108.

The media packaging and distribution system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata. Accordingly, the media packaging and distribution system 102 establishes a shared media session for the plurality of client devices 110.

In this regard, the media packaging and distribution system 102 may provide video programming services to viewers, usually for a subscription fee (such as pay television). The media packaging and distribution system 102 also handles distribution, for example, multicasting, unicasting, broadcasting, streaming, for one or more channels to be viewed on one or more of the plurality of client devices 110.

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the media packaging and distribution system 102. In a broadcast chain, the broadcast provider may receive actual content, for example, from a production studio, in one or more source formats. Examples of the one or more source formats may include, but are not limited to a tape file, or a live feed that may be further converted to a serial digital interface (SDI) video interface and/or on a high-definition SDI (HD-SDI) video interface for processing and playout. The broadcast provider may further process the content, such as insertion of graphics, closed captions, preparation of programming schedule, insertion of triggers, and the like, and final delivery by a broadcasting apparatus. The communicated linear video feed and the playout schedule may correspond to a channel, such as CNN channel that is broadcast to the media packaging and distribution system 102, via a communication network. The linear video feed may be broadcasted as a multi-program transport stream (MPTS) (also referred to as a live video feed) to the media packaging and distribution system 102, via the network 108. The broadcast provider may be owned by (or associated to) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows. Examples of legacy distribution system that may be benefitted from the media packaging and distribution system 102 may include direct-broadcast satellite (DBS) providers, cable television (CATV) systems, and other wireline video providers and competitive local exchange carriers (CLECs) using, for example, IPTV.

The DACIS 103 may be an optional system in the media packaging and distribution system 102, and may comprise suitable logic, circuitry, and interfaces that may be configured to construct and deliver targeted and/or personalized media streams. The DACIS 103 may leverage one-to-one scale of traditional server-side ad insertion systems to support custom programming content choices and not just targeted non-programming content. For example when the user selects to join a live stream, a content decisioning system could determine that, instead of joining the live stream for the last few minutes of a program, the user should instead be shown content more relevant to the next program e.g. show a personalized set of basketball highlights and ads to a user who likely joined the stream to watch the basketball game that is coming on next—do not join the live stream until the previous program ends and the game starts.

The DACIS 103 may be further configured to, via a programming schedule or tag indicator in a disparate live media output stream manifest, be notified of one or more content graphical treatment opportunities within the media content. The DACIS 103 may be further configured to make required non-programming content calls on behalf of the plurality of client devices 110. Accordingly, the DACIS 103 may provide the plurality of client devices 110 with information needed to execute the graphical treatment graphical content via a secure out-of-band channel between the DACIS 103 and the plurality of client devices 110. In accordance with an embodiment, the DACIS 103 may be configured to include not showing non-programming content that a user of a client device may elected to skip or rated poorly in an earlier non-programming content break. Further, the DACIS 103 may enable the user to skip non-programming content as the user interacted with a previous non-programming content or made a purchase and the advertiser elected to sponsor the remainder of the programming content.

In accordance with an embodiment, the DACIS 103 may be configured to provide seamless failover between redundant disparate live media output streams for large events, thus improving reliability. In certain instances, some of the plurality of client devices 110 may support a primary and backup disparate live media output streams and are able to fail between them. In other instances, others of the plurality of client devices 110 may not support the primary and backup disparate live media output streams. In such instances, the client devices have to crash and then try to join an alternative disparate live media output stream. For such client devices, the DACIS 103 may be configured to monitor both the primary and backup disparate live media output streams, and if there is a failure, write the alternative disparate live media output stream into the disparate live media output stream manifest. In accordance with an embodiment, the DACIS 103 may be configured to receive required media content from the CPDS 107.

Each of the plurality of published data sources 104*a*, . . . , 104*n* may be coupled to one or more television networks and may comprise suitable logic, circuitry, and interfaces that may be configured to execute code that provides actual audiences for programs that were distributed. As illustrated in FIG. 1A, the plurality of published data sources 104*a*, . . . , 104*n* are coupled to the media packaging and distribution system 102 via the network 108 and configured to monitor audience drift to or away from a tuned channel airing a live media output stream. The plurality of published data sources 104*a*, . . . , 104*n* may provide actual audiences for programs to an indexing and storage system. An exemplary published data source may be Nielsen. Nielsen has the capability to determine when a viewer watches the same set of media items, for example, advertisements and/or promotional content, in programming data, such as an episode, in a live video feed within 3 days of original airing, and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may include direct/indirect access to other public or private data sources (persistent or ephemeral) through programmatic means.

The shared media session system 105 may comprise suitable logic, circuitry, and interfaces that may be configured to execute a code to manage and establish shared media sessions with the plurality of client devices 110. The shared media session may correspond to duration of media playback with the plurality of client devices 110 acting as participants, whom may be exchanging data and other media as a form of interaction. The shared media session system 105 may be further configured to facilitate participants of a shared media session with constructing a peer-to-peer network, such as the distributed communication network 112, between the participants. The shared media session system 105 may be further configured to facilitate one or more participants to select a disparate live media output stream from a list of available disparate live media output streams. The participant may correspond to a user taking part in the shared media session, and consuming the media of the shared media session. The participant may also act as a client on the peer-to-peer network associated with the shared media session.

In accordance with an embodiment, the shared media session system 105 may be configured to receive list of available media content from the DACIS 103. In accordance with another embodiment, the shared media session system 105 may be configured to receive list of available media content from the CPDS 107. In accordance with yet another embodiment, the shared media session system 105 may be configured to receive a list of available media content from one of the plurality of client devices 110. For example, the first client device 110*a* may be configured to request the shared media session system 105 for a specific Youtube® video for further sharing.

The Ad decisioning servers 106*a*, . . . , 106*n* may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams by the Ad decisioning servers 106*a*, . . . , 106*n* based on the upcoming indicator detected by the media player or the non-programming content proxy server (not shown). The detected indicator may be, such as an inbound trigger, a signaling point, and/or a signal in a pre-encoded media asset and/or a live input stream. The Ad decisioning servers 106*a*, . . . , 106*n* may receive a request for retrieval of non-programming content, for example, ads, from a non-programming content proxy server (not shown). Specifically, the Ad decisioning servers 106a, . . . , 106n may receive the request from one or more of the plurality of client devices 110, via the non-programming content proxy server (not shown). The request may be received when one or more indicators and/or pre-encoded place holder content segment for a scheduled duration of one or more non-programming content breaks. The scheduled durations of one or more non-programming content breaks may be defined by a received programming schedule, and are encountered in the disparate live media output stream manifest during media content playout by media players at the one or more of the plurality of client devices 110.

For requests that are received from the plurality of client devices 110, based on corresponding disparate live media output stream manifests, the Ad decisioning servers 106a, . . . , 106n may identity the opportunities for the real-time content or advertisement placement activity. In this regard, as the advertisement decisioning component of the Ad decisioning servers 106a, . . . , 106n is implemented in a client device, such as one or more of the plurality of client devices 110, the Ad decisioning servers 106a, . . . , 106n may identify real-time content or advertisement placement opportunity for dynamic ad insertion. For example, commercial or non-commercial advertisements may be dynamically inserted within program segments of a media feed based on the detected indicator, such as upcoming inbound trigger, signaling point, and/or signal, in the disparate live media output stream manifest by the Ad decisioning servers 106a, . . . , 106n when the ad decisioning component is implemented in the client device. In various embodiments, the advertisement decisioning component of the Ad decisioning servers 106a, . . . , 106n may be configured to determine which advertisements, graphical treatment graphics and presentation information to serve to the plurality of client devices 110 based on stream ID, a program ID, a geographical location, time, and any preferences associated with an individual consumer or an advertisement ID specified by the disparate live media output stream manifest.

The CPDS 107 may comprise suitable logic, circuitry, and interfaces that may be configured to index programming content, which is prepared for usage. The CPDS 107 may further define metadata detailing various facets of the programming and/or non-programming content including duration, known locations and opportunities for programming and/or non-programming content insertion/replacement.

The network 108 may be any kind of network, or a combination of various networks, and it is shown illustrating the communication that may occur between the Ad decisioning servers 106a, . . . , 106n and the media packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The external storage system 109 may comprise suitable logic, circuitry, and interfaces that may be configured to execute a code to implement a persistent storage of past shared media sessions, containing shared media session event data, audio, and video.

The plurality of client devices 110 may include client devices 110a, . . . , 110n that may refer to end-user devices or consumption devices where the content is played to be consumed by a user. Each client device may correspond to a node on the distributed communication network 112 established for a given shared media session, where a client device may participate. The number of impressions of a media item, such as an advertisement and/or promotional media, on such plurality of client devices 110 determines the advertising impact or promotion impact and number of actual audiences achieved during campaigns. Examples of the plurality of client devices 110 may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The plurality of client devices 110 may further include process/system that may process the output for any means, regardless of the capability or intent to decode for media presentation, and on which the consumer may launch a web page, a web application, or a web service to view media content.

The distributed communication network 112 may comprise suitable logic, circuitry, and interfaces that may be configured to replicate a peer-to-peer network constructed by the participants, such as the plurality of client devices 110, in a given shared media session. The distributed communication network 112 may be used to exchange event data, video, and audio between peers to enable interaction between the participants themselves, and the participants and the media.

The recording client device 114 may comprise suitable logic, circuitry, and interfaces that may be configured to act as a client that connects to the distributed communication network 112 of the shared media session. The recording client device 114 may further observe or record event data, video, and audio exchanged by the remaining peers on the distributed communication network 112 such that all the recorded events may be maintained in the external storage system 109. Such recorded events may be packaged in one or more formats to be provided from the CPDS 107 as another media content to be viewed or searched. After the shared media session has ended, the recording client device 114 may upload the recording of the shared media session to the external storage system 109.

The source devices 118 may comprise suitable logic, circuitry, and interfaces that may be configured to communicate a live media feed or live input streams of a channel, such as an existing channel, to the media packaging and distribution system 102. In accordance with an embodiment, the live input streams of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of client devices 110. The audience data may include demographics data, audience targeting data, trending data, device type data, device platform data, and content recognition-based data, such as automatic content recognition (ACR)-based data. The trending data comprises information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

The content delivery system 122, as described in FIG. 1B, may comprise suitable logic, circuitry, and interfaces that may be configured to distribute media content to the plurality of client devices 110. Generally, the term "content," "metadata," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The content delivery system 122 may be configured to provide a plurality of disparate live media output streams to the plurality of client devices 110, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

Figure 1C:
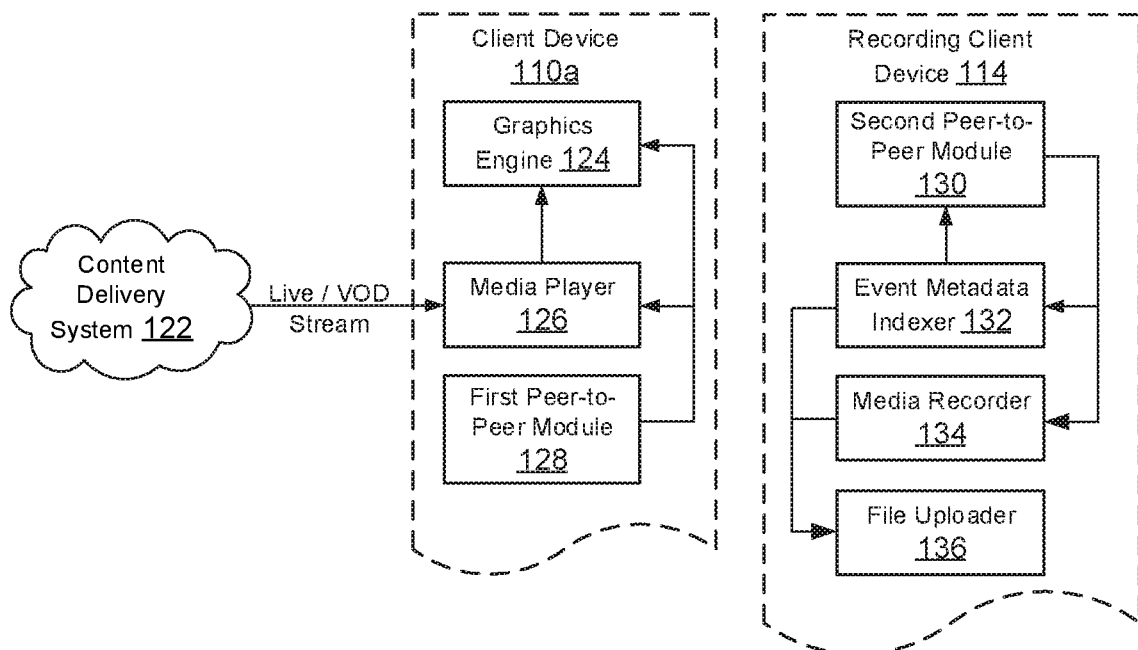
FIG. 1C is a block diagram that illustrates an exemplary recording client device, in accordance with an exemplary embodiment of the disclosure.

FIG. 1C is a block diagram that illustrates an exemplary client device and recording client device, in accordance with an exemplary embodiment of the disclosure. Referring to FIG. 1C, a client device, such as the first client device 110a, may comprise a graphics engine 124, a media player 126, and a first peer-to-peer module 128. The recording client device 114 may comprise a second peer-to-peer module 130, an event metadata indexer 132, a media recorder 134, and a file uploader 136.

The graphics engine 124 may comprise suitable logic, circuitry, and interfaces that may be configured to perform the graphics data processing required to illustrate a 2D or 3D image, text, video, or other media onto a client device corresponding to a received disparate live media output stream manifest. Such image may include one or more objects having visually apparent dimensions in relation to two or three defined axes based on hardware and software configuration of the client device. Typically, the graphics engine 124 comprises of a geometry processing unit, a rasterization unit, and a special function register (SFR).

The media player 126 may comprise suitable logic, circuitry, and interfaces that may be configured to process disparate live media output stream manifests comprising media segments of live input streams and/or pre-encoded media assets. Accordingly, the media player 126 may be configured to generate corresponding disparate live media output streams. Such disparate live media output streams may comprise audio, video, images, or a combination thereof that may correspond to live media input streams and/or pre-encoded media assets. The audio may include an external media, an audio recorded from a microphone, or an application-specific audio resource. Video may include an external media, a video recorded from peer camera, or application-specific video resources (for example, interactive animations). The media player 126 may be further configured to communicate the disparate live media output stream to the graphics engine 124 for rendering media content.

The first peer-to-peer module 128 may comprise suitable logic, circuitry, and interfaces that may be configured to establish a peer-to-peer connection between the client devices from the plurality of client devices 110. The second peer-to-peer module 130 may comprise suitable logic, circuitry, and interfaces that may be configured to join a peer-to-peer connection between the recording client device 114 and client devices from the plurality of client devices 110.

The event metadata indexer 132 may comprise suitable logic, circuitry, and interfaces that may be configured to index metadata associated with an event, such as a user interaction with media, a user interaction with another user, broadcast notifications of a network state of the user, and/or broadcast notifications of an application state of the user. Examples of the user interaction with media may include, but are not limited to, pausing video for all users and rewinding/fast-forwarding/seeking media for all users. Examples of the broadcast notifications of the network state of the user may include, but are not limited to, a connected state, a disconnected state, or a sending data state. Examples of the broadcast notifications of the application state of the user may include, but are not limited to, a muted audio, an invoked interactive element, an interactive element invocation completion, and/or a change in user application configuration.

The media recorder 134 may comprise suitable logic, circuitry, and interfaces that may be configured to record event data, and media, such as video and audio, exchanged by the remaining peers, such as the plurality of client devices 110, during the shared media session.

The file uploader 136 may comprise suitable logic, circuitry, and interfaces that may be configured to upload the recording of the shared media session to the external storage system 109, such as the recorded client sessions database.

In operation, the shared media session system 105 in the media packaging and distribution system 102 may be configured to generate a shared media session for a disparate live media output stream requested (or selected) by a user associated with a client device, for example, the first client device 110a. In accordance with an embodiment, the shared media session system 105 may be configured to provide a list of available media content comprising live input streams and/or pre-encoded media assets for selection to the user.

The shared media session system 105 may further define a content identifier for the shared media session. Based on the content identifier, one or more of the plurality of client devices 110 may be configured to request data associated with the recorded shared media session. The shared media session may be defined to have at least a number of participants, a selection of media content based on which a disparate live media output stream manifest is generated, a first flag that indicates the shared media session is discoverable by the one or more second client devices 110b, . . . , 110n via, and a second flag that indicates the shared media session is to be recorded. Each participant, such as one of the plurality of client devices 110 may interact with the playback of the disparate live media output stream. As described above, the media content may be selected by the user associated with the first client device 110a from a list of existing and referenced media content provided by the one or more processors, or submitted by the user from an external source.

In accordance with various embodiments, the user associated with the first client device 110a may initiate an establishment of a single-participant or a multi-participant shared media session with the shared media session system 105. The user may schedule the disparate live media output stream and initiate the playback of the disparate live media output stream. In case of single-participant shared media session, the shared media session may not have more than one participant, for example the first client device 110a. Further, in case of single-participant shared media session, the disparate live media output stream may comprise media segments of a live input stream or a pre-encoded media asset. However, in case of multi-participant shared media session, the shared media session may have more than one participant, for example the plurality of client devices 110. Further, in case of multi-participant shared media session, the disparate live media output stream may comprise media segments of one or more live input streams and/or one or more pre-encoded media assets.

In accordance with an embodiment when the shared media session is a single-participant shared media session, the user associated with the first client device 110*a* may be configured to initiate a playback of disparate live media output stream selection, via the media player 126, based on scheduling of the disparate live media output stream to be created. In accordance with an embodiment, the shared media session may be flagged for recording, as indicated by the second flag, either during shared media session creation or after shared media session initiation. The first client device 110*a* may be configured to establish the distributed communication network 112, such as a peer-to-peer connection. The first client device 110*a* may communicate a client identifier and an IP address to the shared media session system 105. The recording client device 114 may be configured to join the distributed communication network 112 established by the first client device 110*a*, via the second peer-to-peer module 130. The recording client device 114 may be configured to record event data and media exchanges that originate from the first client device 110*a* during playback. Such recordings may not include the disparate live media output stream selected for playback during the shared media session. Each event data and media exchange may have a playhead time of playback of the disparate live media output stream, and a real-time of the event. The event data and the media exchanges may then be synchronized with the playback of the disparate live media output stream.

In accordance with various embodiments, the user may choose to pause, seek, rewind, or fast-forward as the window of the disparate live media output stream allows. Thereafter, the user may choose to terminate the shared media session. When the first client device 110*a* abandons the distributed communication network 112, the recording client device 114 may cease the recording of the event data and the media exchanges. In accordance with an embodiment, the recording client device 114 may generate an alert for the shared media session system 105 to close the shared media session.

In accordance with an embodiment when shared media session is a multi-participant shared media session, the participants, such as the second client devices 110*b*, . . . , 110*n*, may be configured to discover and join the shared media session, via the corresponding peer-to-peer modules, similar to the first peer-to-peer module 128. In such case, the shared media session may be advertised explicitly and selected by the first client device 110*a* via an invitation or a shared universal resource locator, via an external advertisement service via a universal resource locator or an identifier, or within context of a group of shared media sessions discovered within the shared media session system 105.

When multiple participants join the shared media session, a first participant, for example the first client device 110*a*, may establish the distributed communication network 112 and communicates the client identifier and IP address to the shared media session system 105 where it is stored. Thereafter, other participants, for example the second client devices 110*b*, . . . , 110*n* in the shared media session may discover the new client identifier from the shared media session system 105. The distributed communication network 112 may be established directly between the participants where client identifier of each participant may be used to identify and share data between various participants, such as the plurality of client devices 110. Media exchanged between the participants, corresponding to the shared media session and previous shared media sessions from the recording client device 114, may include, but are limited to audio and video. Audio may include, for example, external media, audio recorded from a microphone, or application-specific audio resources. Video may include, for example, external media, video recorded from peer camera, or application-specific video resources (for example, interactive animations). Further, event data corresponding to the shared media session and previous shared media sessions may include, but are not be limited to a user interaction with the disparate live media output stream to pause video for all users or rewind/fast-forward/seek disparate live media output stream for all users, a user interaction with another user, a broadcast notifications of network state of the user, or a broadcast notifications of application state of the user. The shared media session system 105 may observe the event data and the media exchanges on the shared media session by use of the distributed communication network 112. Based on the received event data and the media exchanges, the shared media session system 105 may generate the persistent records. The persistent records may include a persistent audio exchanged between participants on the distributed communication network 112, persistent video exchanged between participants on the distributed communication network 112, persistent event data exchanged between participants on the distributed communication network 112, time of event data, audio, and video in accordance with real time, and time of event data, audio, and video data in accordance with time of the disparate live media output stream. In accordance with an embodiment, the recording of the shared media session may be coordinated with the start of shared media session and according to number of participants in the distributed communication network 112.

In accordance with an embodiment, the file uploader 136 in the recording client device 114 may upload the persistent record to the external storage system 109. In such cases, the event data, audio, and video may be used to recreate the shared media session in the future. Further, the persistent record may be referenced from the external storage system 109 and further distributed through a distribution system, such as the CPDS 107.

In accordance with an embodiment, the shared media session may be scheduled within the shared media session system 105 to start at a given date and time. The date and time may correspond to a live event. Further, an ability of a participant to join or not join the shared media session may coordinate disparate live media output stream with the scheduled date and time.

In accordance with an embodiment, a participant in the distributed communication network 112 may initiate the playback of the disparate live media output stream. For example, a client device of the plurality of client devices 110 may be configured to initiate the playback of the disparate live media output stream. The playback of the disparate live media output stream may be synchronized across the participants. The synchronization may be performed using streaming media and control flow protocols (for example Real Time Streaming Protocol (RTSP)/Real-time Transport Protocol (RTP)), using a hybrid of two or more streaming media and control flow protocols (for example RTSP/RTP with TS segments from HLS), using the synchronizing client device to send playhead time relative to the calculated offset of a given time of a participant, constraining a live window of playback of the disparate live media output stream and the size of the media segments such that the variability of different playback positions is limited to an accepted value, or a combination thereof.

In accordance with an embodiment, the event data may be synchronized to all participants across the distributed communication network 112. The event data may contain a combination of real-time and media playhead time to maintain event sequence. Further, the events may have application-specific actions that may be executed, such as, but not limited to interactivity between participants, updating playback state of the disparate live media output stream, changing playback state of the disparate live media output stream, changing application state, and/or addition or removal of participants to or from the distributed communication network 112.

The persistent records may be further distributed and/or promoted from the external storage system 109. In accordance with an embodiment, the persistent records, having been synchronized with the playback of the disparate live media output stream, may then be transcoded and distributed as a new media asset.

In accordance with an embodiment, when the plurality of client devices 110 abandon the distributed communication network 112, the recording client device 114 may be configured to cease the recording of the event data and media exchanges. Thereafter, the recording client device 114 may generate an alert for the shared media session system 105 to close the shared media session.

In accordance with another embodiment, the shared media session system 105 in the media packaging and distribution system 102a may be configured to generate a new disparate live media output stream by augmenting existing disparate live media output stream. The augmentation of the existing disparate live media output stream may be based on additional data and/or media (such as audio or video), having resulted from the persisted record of the shared media session. The new disparate live media output stream may have multiple distinct audio channels, resulting from a participant audio interaction, such as voice, and a participant-invoked application audio. The new disparate live media output stream may further have multiplexed audio, that may comprise a participant audio interaction, such as voice, a participant-invoked application audio, or an original media audio.

For example, while watching a basketball game as a disparate live media output stream during a shared media session, one or more users provide comments on one or more actions of players at one or more timestamps. Thus, the resulting persistent record of the shared media session may comprise an audio of the one or more users commenting in relation to the disparate live media output stream, such as the basketball game, at the one or more timestamps. The CPDS 107 may be configured to retrieve the persistent record comprising the audio that was recorded and consequently augment to the existing disparate live media output stream and operate as a new disparate live media output stream.

The recording client device 114 may be configured to record the event data and media exchanges between client devices from the plurality of client devices 110 during playback of the existing disparate live media output stream. The persistent record may exclude the existing disparate live media output stream selected for the shared media session playback. Each event data and media exchange may include playhead time of the playback of the existing disparate live media output stream, and real-time of event. Further, the event data and media exchange may be synchronized with the playback of the existing disparate live media output stream in the shared media session. Such persistent record of the event data and media exchanges may be synchronized with the playback of the existing disparate live media output stream of the shared media session and transcoded and distributed as the new disparate live media output stream. As described above, the recording client device 114 may be configured to communicate the generated persistent record to the external storage system 109 for further distribution and promotion. In accordance with an embodiment, a shared media session may be recreated at a future time based on the event data and media in the persistent record. In accordance with an embodiment, the CPDS 107 may be configured to distribute the persistent record, retrieved from the external storage system 109, to the plurality of client devices 110 in the distributed communication network 112 via the content delivery system 122. In accordance with an embodiment, the CPDS 107 may be configured to transcode from the existing, persistent and stored version to a new format. Consequently, persistent records, comprising recorded event data and media exchanges, having been synchronized with playback of the existing disparate live media output stream in the shared media session, may be transcoded and distributed as a new disparate live media output stream. Upon the plurality of client devices 110 abandoning the distributed communication network 112, the recording client device 114 may be configured to cease the recording. Further, the recording client device 114 may alert the shared media session system 105 to close (or terminate) the shared media session.

Figure 2:
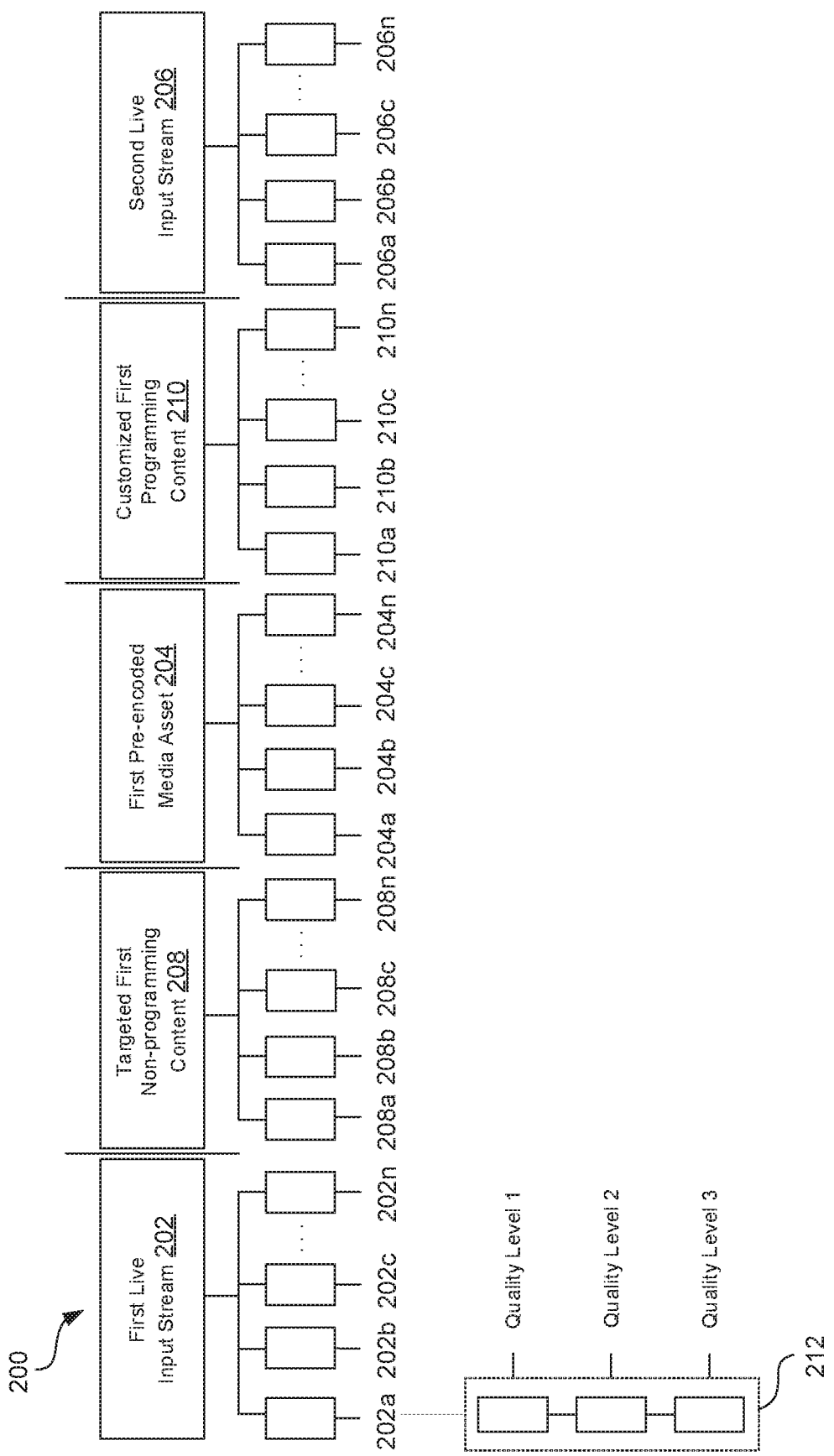
FIG. 2 illustrates segmentation of live input streams and pre-encoded media assets for a programming schedule for establishing a shared media session for one or more client devices by the shared media session system of FIGS. 1A and 1B, in accordance with an exemplary embodiment of the disclosure.

FIG. 2 illustrates segmentation of live input streams and pre-encoded media assets for a programming schedule for establishing a shared media session for one or more client devices by the shared media session system 105 of FIGS. 1A and 1B, in accordance with an exemplary embodiment of the disclosure. Referring to the exemplary arrangement of FIG. 2, there is shown a first live input stream 202, a first pre-encoded media asset 204, and a second live input stream 206. There is also shown a targeted first non-programming content 208 placed after the first live input stream 202, and a customized first programming content 210 placed after the first pre-encoded media asset 204 by the DACIS 103. The first live input stream 202 may be segmented into a first set of video segments 202a, 202b, 202c, . . . , 202n. Similarly, the first pre-encoded media asset 204 and the second live input stream 206 may also be segmented into second set of video segments 204a, 204b, 204c, . . . , 204n, and third set of video segments 206a, 206b, 206c, . . . , 206n respectively. By way of example, the segmentation may be executed by a segmenting system (not shown) during a preparation stage of the media assets. In accordance with an embodiment, the segments of the first set of video segments 202a, 202b, 202c, . . . , 202n, the second set of video segments 204a, 204b, 204c, . . . , 204n, and third set of video segments 206a, 206b, 206c, . . . , 206n, may be segmented into consistent length, for example, 10 seconds segments. It may be advantageous to have a consistent and smaller file size of segments to be able to quickly push to the content delivery system 122, and also for quick downloading by a media player at the end-user side, such as on the plurality of client devices 110.

It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the programming schedule may be possible with respect to interstitial content items, such as the targeted first non-programming content 208 and the customized first programming content 210.

The insertion of the live input stream manifests, pre-encoded media asset manifests, the targeted first non-programming content 208 and the customized first programming content 210 may be done on-the-fly based on dynamic scheduling by the shared media session system 105 that generates the programming schedule. The insertion may be driven by real time or near-real time content context analysis, user-selection on the plurality of client devices 110, or driven by external data received from the external data source 120. The shared media session system 105 may include a personalized manager (not shown) in association with the stream selection service (not shown) may be configured to insert live input streams, such as the first live input stream 202 and the second live input stream 206, or pre-stored media assets, such as the first pre-encoded media asset 204, the targeted first non-programming content 208 and the customized first programming content 210, in an existing disparate live media output stream based on manipulation of a manifest the existing disparate live media output stream, such as an existing channel.

In accordance with an embodiment, each segment of the first set of video segments 202a, 202b, 202c, . . . , 202n, the second set of video segments 204a, 204b, 204c, . . . , 204n, and third set of video segments 206a, 206b, 206c, . . . , 206n, may be further processed to be stored at various quality levels, and content encryption modes for the purposes of adaptive bitrate streaming and digital rights management, for example, the video segment 202a may be stored in a plurality of quality levels, for example, high definition (HD), high dynamic range (HDR) video, or different quality levels in accordance with specified pixel resolutions, bitrates, frame rates, and/or sample frequencies. As each of the media content, such as 202 to 206, are encoded, segmented, and stored with the plurality of quality levels in a media content master storage system. The media content may be re-used to create new channels, such as a new disparate live media output stream, without having to re-encode a selected live input stream or a pre-encoded media asset when a new disparate live media output stream is created using the live input streams or a pre-encoded media asset.

For the sake of brevity, and with reference to FIG. 2, there is shown an example of publishing first and updated (or alternate) disparate live media output streams based on dynamic insertion of targeted non-programming content and customized programming content by the DACIS 103 of FIGS. 1A and 1B. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of client devices 110 based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. Further, based on different operational and technical requirements, publishing of disparate live media output stream may be different. The media content that is prepared and distributed may include both the programming content, such as long-form presentations, short-form presentations, news or sporting events; and non-programming content, such as paid advertisements, public service advertisements, or promotional material.

Figure 3A:
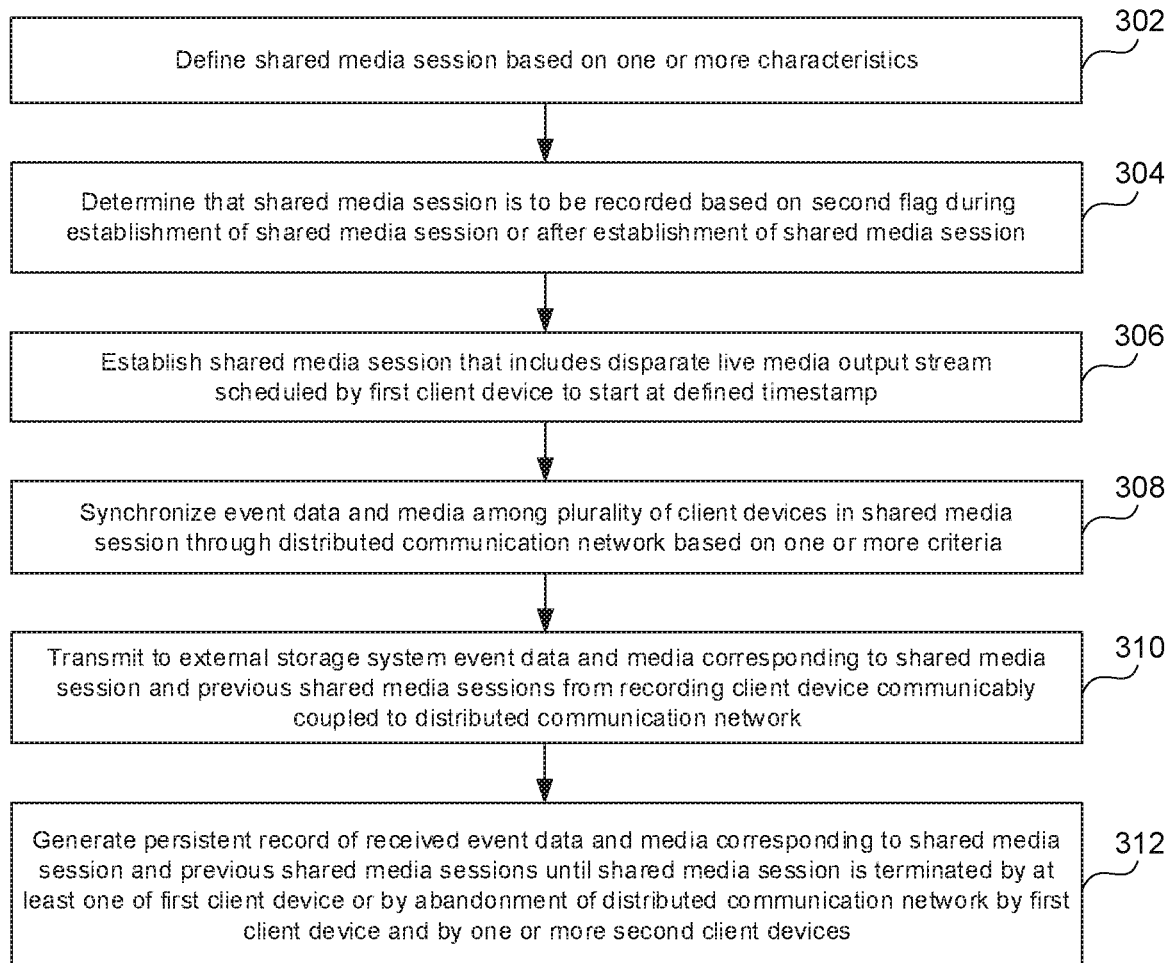
FIG. 3A depicts a first flowchart illustrating exemplary operations of methods for establishing a shared media session for one or more client devices in the shared media session system of FIG. 1B, in accordance with an exemplary embodiment of the disclosure.

FIG. 3A depicts a first flowchart illustrating exemplary operations of methods for establishing a shared media session for one or more client devices in the shared media session system of FIG. 1B, in accordance with an exemplary embodiment of the disclosure.

At 302, the shared media session may be defined based on one or more characteristics. In accordance with an embodiment, the shared media session system 105 may be configured to define the shared media session based on one or more characteristics.

In accordance with an embodiment, the shared media session system 105 may be configured to define the shared media session when the user initiates creation of a new single-participant shared media session with the shared media session system 105. In accordance with another embodiment, the shared media session system 105 may be configured to define the shared media session when the user initiates creation of a new multi-participant shared media session with the shared media session system 105. In such embodiments, the user may be associated with the first client device 110a. Various examples of the one or more characteristics may include, but are not limited to, a count of client devices that participate in the shared media session and interact with a disparate live media output stream, a selection of media content based on which a disparate live media output stream manifest is generated, a first flag that indicates the shared media session is discoverable by the one or more second client devices, and a second flag that indicates the shared media session is to be recorded. In accordance with an embodiment, the selection of the media content may be performed by the user associated with the first client device 110a from a list of existing and referenced media content provided by the one or more processors, or submitted by the user from an external storage.

At 304, the shared media session to be recorded may be determined based on the second flag during the establishment of the shared media session or after the establishment of the shared media session. In accordance with an embodiment, the shared media session system 105 may be configured to determine that the shared media session is to be recorded based on the second flag during the establishment of the shared media session or after the establishment of the shared media session. Accordingly, in accordance with an embodiment, the shared media session system 105 may be configured to record the shared media session in a recorded client session database, such as the external storage system 109. In accordance with another embodiment, the recording client device 114 may be configured to record the shared media session in the recorded client session database, such as the external storage system 109.

At 306, the shared media session may be established that includes a disparate live media output stream scheduled by the first client device 110a to start at a defined timestamp. In accordance with an embodiment, the shared media session system 105 may be configured to establish the shared media session that includes the disparate live media output stream scheduled by the first client device 110a to start at a defined timestamp.

In accordance with an embodiment, the shared media session system 105 may be configured to establish the shared media session as a single-participant shared media session that comprises the first client device 110a and is initiated by the first client device 110a. In accordance with an embodiment, the shared media session system 105 may be configured to establish the shared media session as a multi-participant shared media session that comprises the plurality of client devices 110, and is initiated by the first client device 110a. The shared media session may be established as the single-participant shared media session or the multi-participant shared media session based on the type of request initiated by the user, as described at exemplary operation 302. In accordance with an embodiment, when the shared media session system 105 establishes the shared media session as the single-participant shared media session, the shared media session may not have more than one participant, such as the first client device 110a.

In accordance with another embodiment, when the shared media session system 105 establishes the shared media session as the multi-participant shared media session, the shared media session may have the plurality of participants, such as the plurality of client devices 110. In such embodiment, the plurality of client devices 110 may be configured to discover and join the distributed communication network 112, via the corresponding peer-to-peer module similar to the first peer-to-peer module 128. The shared media session may be advertised explicitly and selected by the first client device 110a via an invitation or a shared universal resource locator. The shared media session may be further advertised via an external advertisement service via a universal resource locator or an identifier. The shared media session may be further advertised within context of a group of shared media sessions discovered within the shared media session system 105.

When the plurality of client devices 110 joins the shared media session as participants, the first participant, for example, the first client device 110a, may be configured to establish the distributed communication network 112, via the first peer-to-peer module 128. In such a case, an identifier may be established for each participant and communicated to the shared media session system 105. The shared media session system 105 may be configured to receive and store the identifier from the first client device 110a, and the identifier may be discovered by the one or more second client devices 110b, . . . , 110$n_{-5}$ in the shared media session. In accordance with an embodiment, shared media session system 105 may be configured to receive and store the identifiers from the remaining client devices 110$n_{-5}$, . . . , 110n, and the identifiers may be discovered by the one or more second client devices 110b, . . . , 110n in the shared media session In accordance with an embodiment, a peer-to-peer network, for example the distributed communication network 112, may be established directly between client devices from the plurality of client devices 110. Each client device within the distributed communication network 112 may be identified based on corresponding identifier. Once the distributed communication network 112 is established, event data and media may be shared between client devices from the plurality of client devices 110 through the distributed communication network 112 based on corresponding identifiers.

The media may comprise audio data and video data. The audio data may include, for example, at least an external audio media, an audio recorded from a microphone, or an application-specific audio resource. The video data may include, for example, at least an external video media, a video recorded from a participant camera, or an application-specific video resource. The event data may include, for example, a first user interaction with the disparate live media output stream that pauses video for the plurality of client devices 110, plays rewinds, fast-forward or seek media for the plurality of client devices 110, or a second user interaction with another user. The event data may further include, for example, a first broadcast notification of network state of the plurality of client devices 110 that is one of connected, disconnected or sending data. The event data may further include, for example, a second broadcast notification of application state of the plurality of client devices 110 that is one of a muted audio, an invoked interactive element, a completion of the invoked interactive element, a change in user application configuration, an update in playback state of the disparate live media output stream, a change in the playback state of the disparate live media output stream, addition of new client devices or removal of existing one or more client devices from the plurality of client devices 110.

In accordance with an embodiment, wherein a schedule of the shared media session within the shared media session system 105 may indicate a start of the disparate live media output stream at a defined timestamp and date. The defined timestamp and date may correspond with at least one of a live event streamed in the disparate live media output stream or pre-encoded media assets streamed in the disparate live media output stream. In accordance with an embodiment, the one or more second client devices 110b, . . . , 110$n_{-5}$ join or do not join the shared media session based on coordination with the defined timestamp and date in the schedule.

At 308, event data and media may be synchronized among the plurality of client devices 110 in the shared media session through the distributed communication network 112 based on one or more criteria. In accordance with an embodiment, the shared media session system 105 may be configured to synchronize the event data and the media among the plurality of client devices 110 in the shared media session through the distributed communication network 112 based on one or more criteria.

In accordance with an embodiment, when a user or a participant, for example the first client device 110a, in the distributed communication network 112, such as the peer-to-peer network, initiates the playback of the disparate live media output stream, via the media player 126, the event data may be synchronized among the plurality of client devices 110 in the shared media session through the distributed communication network 112. Event data may include a combination of real time and media playhead time to maintain event sequence. Event data may have application-specific actions that may be executed, such as, interactivity between peers, updating media playback state, changing media playback state, changing application state, and/or addition or removal of peers.

In accordance with an embodiment, when a user or a participant, for example the first client device 110a of the plurality of client devices 110, in the distributed communication network 112, such as the peer-to-peer network, initiates the playback of the disparate live media output stream, via the media player 126, the media may be synchronized among the plurality of client devices 110 in the shared media session through the distributed communication network 112 based on the one or more criteria. Examples of the one or more criteria may be defined based on a level of synchronization accuracy corresponding to type of media content in the disparate live media output stream, and view of same position in the disparate live media output stream by each client device concurrently. The one or more criteria may be further defined based on a combination of one or more streaming protocols for example RTSP/RTP, and one or more control flow protocols utilized for synchronization, for example RTSP/RTP with TS segments from HLS. The one or more criteria may be further defined based on usage of a synchronizing client device of the plurality of client devices 110 to send playhead time relative to a calculated offset of time of another client device, application of constraints on a live window during playback of the disparate live media output stream and size of media segments in the disparate live media output stream such that a variability of different playback positions is limited to an accepted value, or a combination thereof.

At 310, the event data and media corresponding to the shared media session and previous shared media sessions may be transmitted to the external storage system 109 from the recording client device 114 communicably coupled to the distributed communication network 112. In accordance with an embodiment, the external storage system 109 may be configured to receive the event data and media corresponding to the shared media session and previous shared media sessions from the recording client device 114 communicably coupled to the distributed communication network 112.

At 312, a persistent record of received event data and media corresponding to the shared media session and previous shared media sessions may be generated until the shared media session is terminated by at least one of the first client device 110a or by abandonment of the distributed communication network 112 by the first client device 110a and by the one or more second client devices 110b, . . . , 110$n_{-5}$. The persistent records of the shared media session may be generated when the shared media session is flagged for recording, either during the shared media session creation or after the shared media session initiation.

The distributed communication network 112 is established by the first client device 110a in case of a single-participant shared media session, or the first client device 110a from the plurality of client devices 110, in case of a multi-participant shared media session. A client identifier and a device address may be communicated to the shared media session system 105 by the first client device 110a. Thereafter, the recording client device 114 joins the distributed communication network 112 via the second peer-to-peer module 130, upon establishment, and then the event data and media exchanges originated from one or more of the plurality of client devices 110 during the playback of the disparate live media output stream is recorded by the recording client device 114. In such case, the persistent record excludes the disparate live media output stream selected for the playback in the shared media session. Each event data and media exchange may include a playhead time of media playback, and real-time of event. Event data and media exchanges may then be synchronized with the playback of the disparate live media output stream in the shared media session.

In case of multi-participant shared media session, the generated persistent record may comprise a persistent audio data exchanged between client devices from the plurality of client devices 110 on the distributed communication network 112, a persistent video data exchanged between client devices from the plurality of client devices 110 on the distributed communication network 112, a persistent event data exchanged between client devices from the plurality of client devices 110 on the distributed communication network 112, and/or time of the event data, audio data, and/or video data in accordance with real time or time of the disparate live media output stream. The persistent records of the shared media session may be coordinated with a start of shared media session, and/or according to number of participants in the peer-to-peer network.

In accordance with an embodiment, the shared media session system 105 may be configured to persist the shared media session until the shared media session is terminated by the first client device 110a, in case of single-participant shared media session. In accordance with another embodiment, the shared media session system 105 may be configured to persist the shared media session until the shared media session is terminated by the creating device, such as the first client device 110a, or all participants have abandoned the shared media session, in case of multi-participant shared media session.

Figure 3B:
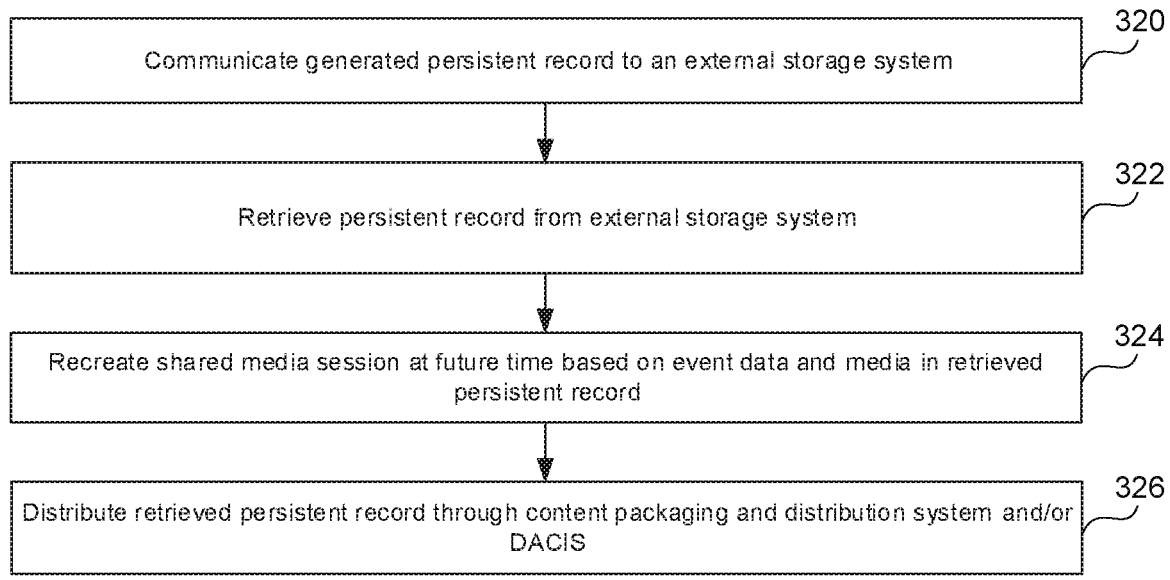
FIG. 3B depicts a second flowchart illustrating exemplary operations of methods for establishing a shared media session for one or more client devices in the shared media session system of FIG. 1B, in accordance with an exemplary embodiment of the disclosure.

FIG. 3B depicts a second flowchart illustrating exemplary operations of methods for establishing a shared media session for one or more client devices in the shared media session system of FIG. 1B, in accordance with an exemplary embodiment of the disclosure.

At 320, the generated persistent record may be communicated to the external storage system 109. In accordance with an embodiment, the file uploader 136 in the recording client device 114 may be configured to communicate the generated persistent record to the external storage system 109. The recorded event data and media exchanges may be uploaded to the external storage system 109, such as the recorded client session database, where it may be further distributed and/or promoted. Recorded event data and media exchanges, having been synchronized with playback of the disparate live media output stream in the shared media session, may then be transcoded and distributed as a new media asset.

At 322, the persistent record may be retrieved from the external storage system 109. In accordance with an embodiment, the CPDS 107 may be configured to retrieve the persistent record from the external storage system 109.

At 324, the shared media session may be recreated at a future time based on the event data and media in the retrieved persistent record. In accordance with an embodiment, the shared media session system 105, in conjunction with the CPDS 107, may be configured to recreate the shared media session at a future time based on the event data and media in the retrieved persistent record.

At 326, the retrieved persistent record may be distributed through the CPDS 107 and/or the DACIS 103. In accordance with an embodiment, the CPDS 107 and/or DACIS 103 may be configured to distribute the retrieved persistent record to the plurality of client devices 110 in the distributed communication network 112 via the content delivery system 122.

Figure 3C:
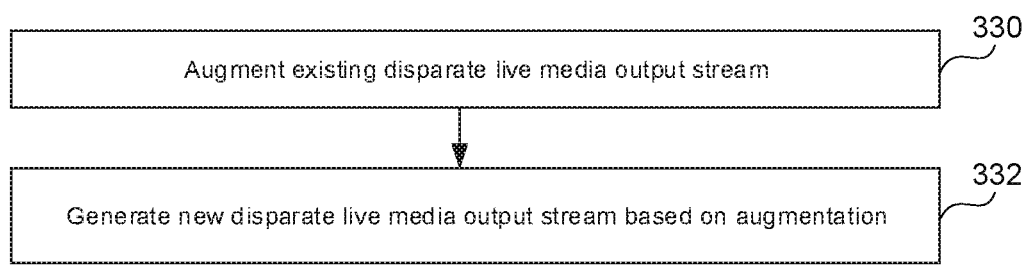
FIG. 3C depicts a third flowchart illustrating exemplary operations of methods for establishing a shared media session for one or more client devices in the shared media session system of FIG. 1B, in accordance with an exemplary embodiment of the disclosure.

FIG. 3C depicts a third flowchart illustrating exemplary operations of methods for establishing a shared media session for one or more client devices in the shared media session system of FIG. 1B, in accordance with an exemplary embodiment of the disclosure.

At 330, an existing disparate live media output stream may be augmented. In accordance with an embodiment, a stream publishing engine (not shown) may be configured to augment the existing disparate live media output stream. The augmentation may be based on the event data and media corresponding to the persistent record of the shared media session. In accordance with another embodiment, the DACIS 103 may be configured to augment the existing disparate live media output stream. In such case, the augmentation may be based on dynamic ad/content insertion system designed to construct and deliver targeted and/or personalized disparate live media output streams.

At 332, a new disparate live media output stream may be generated. In accordance with an embodiment, a stream publishing engine in the shared media session system 105 may be configured to generate the new disparate live media output stream. The new disparate live media output stream may comprise a plurality of distinct audio channels based on an audio interaction of one of the plurality of client devices, and/or an application state of one of the plurality of client devices. The new disparate live media output stream may further comprise a multiplexed audio that may include an audio interaction of one of the plurality of client devices 110, an application state of one of the plurality of client devices 110, and/or an audio of the existing disparate live media output stream. Further, the recording client device 114 may be configured to record the event data and media exchanges between client devices from the plurality of client devices 110 during playback of the existing disparate live media output stream. The persistent record may exclude the existing disparate live media output stream selected for the shared media session playback. Each event data and media exchange may include playhead time of the playback of the existing disparate live media output stream, and real-time of event. Further, the event data and media exchange may be synchronized with the playback of the existing disparate live media output stream in the shared media session. Such persistent record of the event data and media exchanges may be synchronized with the playback of the existing disparate live media output stream of the shared media session and transcoded and distributed as the new disparate live media output stream. As described above, the recording client device 114 may be configured to communicate the generated persistent record to the external storage system 109 for further distribution and promotion. In accordance with an embodiment, a shared media session may be recreated at a future time based on the event data and media in the persistent record. In accordance with an embodiment, the CPDS 107 may be configured to distribute the persistent record, retrieved from the external storage system 109, to the plurality of client devices 110 in the distributed communication network 112 via the content delivery system 122. In accordance with an embodiment, the CPDS 107 may be configured to transcode from the existing, persistent and stored version to a new format. Consequently, persistent records, comprising recorded event data and media exchanges, having been synchronized with playback of the existing disparate live media output stream in the shared media session, may be transcoded and distributed as a new disparate live media output stream. Upon the plurality of client devices 110 abandoning the distributed communication network 112, the recording client device 114 may be configured to cease the recording. Further, the recording client device 114 may alert the shared media session system 105 to close (or terminate) the shared media session.

Figure 3D:
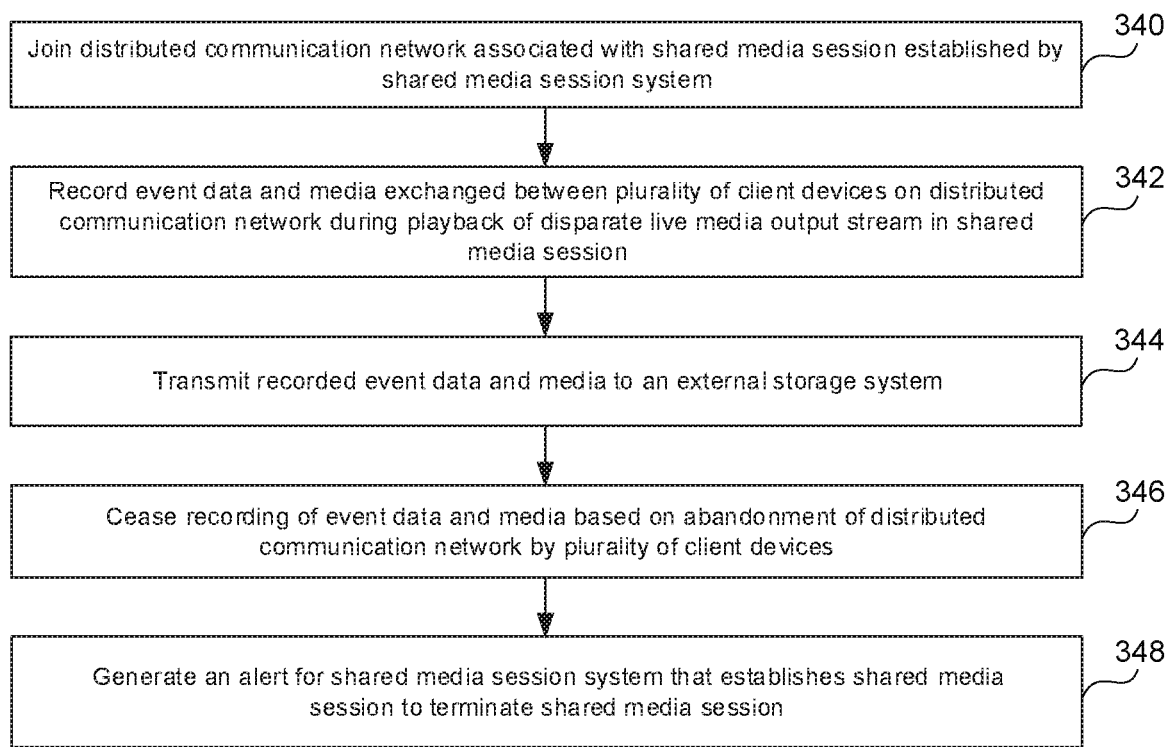
FIG. 3D depicts a fourth flowchart illustrating exemplary operations of methods for establishing a shared media session for one or more client devices in the shared media session system of FIG. 1B, in accordance with an exemplary embodiment of the disclosure.

FIG. 3D depicts a fourth flowchart illustrating exemplary operations of methods for establishing a shared media session for one or more client devices in the shared media session system of FIG. 1B, in accordance with an exemplary embodiment of the disclosure.

At 340, the distributed communication network 112 associated with shared media session established by shared media session system 105 may be joined. In accordance with an embodiment, the recording client device 114 may be configured to join the distributed communication network 112 associated with shared media session established by shared media session system 105, via the second peer-to-peer module 130.

At 342, the event data and media exchanged between client devices from the plurality of client devices 110 on the distributed communication network 112 during playback of disparate live media output stream in shared media session may be recorded. In accordance with an embodiment, the recording client device 114 may be configured to record the event data and media exchanged between client devices from the plurality of client devices 110 on the distributed communication network 112 during playback of disparate live media output stream in shared media session.

At 344, the recorded event data and media may be transmitted to the external storage system 109. In accordance with an embodiment, the recording client device 114 may be configured to transmit the recorded event data and media to the external storage system 109.

At 346, the recording of event data and media may be ceased based on abandonment of the distributed communication network 112 by the plurality of client devices 110. In accordance with an embodiment, the recording client device 114 may be configured to cease the recording of event data and media based on abandonment of the distributed communication network 112 by the plurality of client devices 110.

At 348, an alert may be generated for the shared media session system 105 that establishes the shared media session to terminate shared media session. In accordance with an embodiment, the recording client device 114 may be configured to generate an alert for the shared media session system 105 that establishes the shared media session to terminate shared media session.

Figure 4:
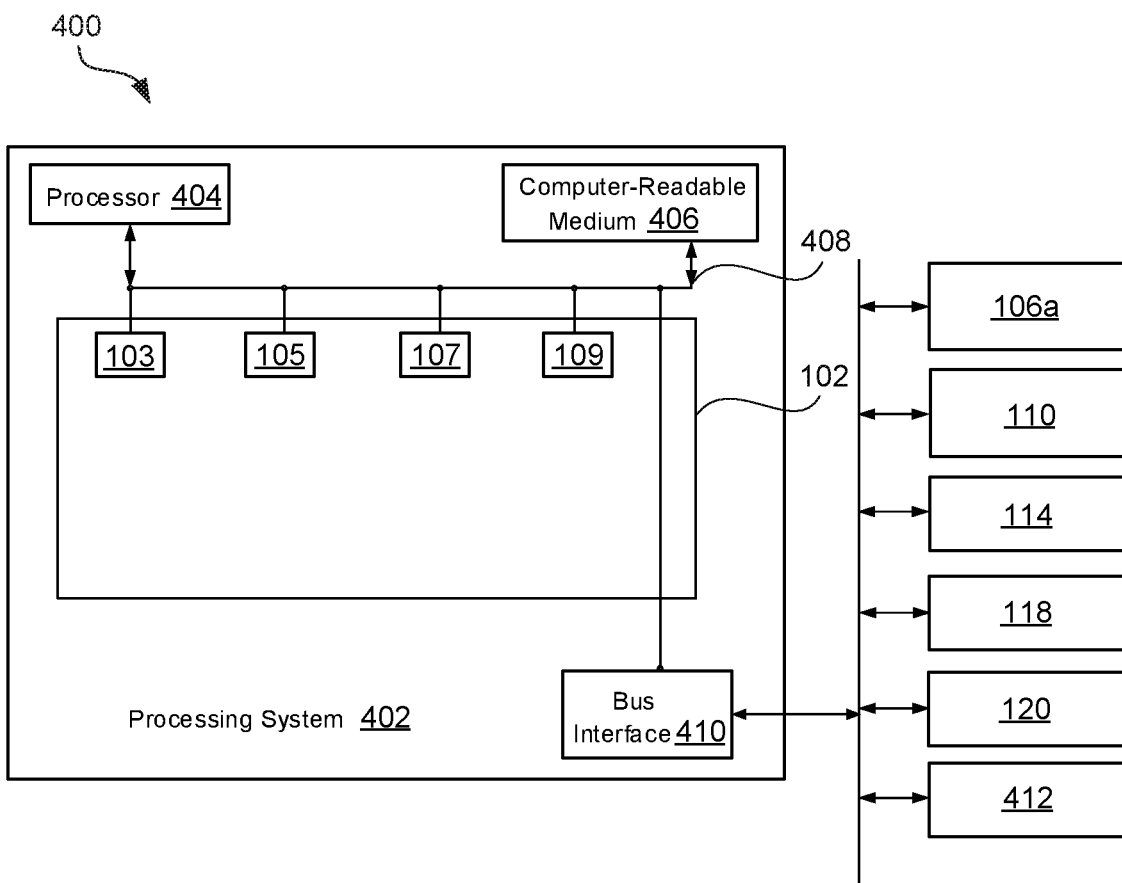
FIG. 4 is a conceptual diagram illustrating an example of a hardware implementation for the shared media session system employing a processing system for establishing a shared media session for one or more client devices, in accordance with an exemplary embodiment of the disclosure.

FIG. 4 is a conceptual diagram illustrating an example of a hardware implementation for a media packaging and distribution system 102 employing a processing system for establishing a shared media session for one or more client devices, in accordance with an exemplary embodiment of the disclosure. Referring to FIG. 4, the hardware implementation shown by a representation 400 for the media packaging and distribution system 102 employs a processing system 402 for establishing a shared media session for one or more client devices, in accordance with an exemplary embodiment of the disclosure, as described herein.

In some examples, the processing system 402 may comprise one or more hardware processors 404, a non-transitory computer-readable medium 406, a bus 408, a bus interface 410, and a transceiver 412. FIG. 4 further illustrates the DACIS 103, the shared media session system 105, the CPDS 107, and the external storage system 109, as described in detail in FIGS. 1A and 1B.

The hardware processor 404 may be configured to manage the bus 408 and general processing, including the execution of a set of instructions stored on the non-transitory computer-readable medium 406. The set of instructions, when executed by the processor 404, causes the media packaging and distribution system 102 to execute the various functions described herein for any particular apparatus. The hardware processor 404 may be implemented, based on a number of processor technologies known in the art. Examples of the hardware processor 404 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 406 may be used for storing data that is manipulated by the processor 404 when executing the set of instructions. The data is stored for short periods or in the presence of power. The non-transitory computer-readable medium 406 may also be configured to store data for one or more of the DACIS 103, the shared media session system 105, the CPDS 107, and the external storage system 109.

The bus 408 is configured to link together various circuits. In this example, the media packaging and distribution system 102 employing the processing system 402 and the non-transitory computer-readable medium 406 may be implemented with bus architecture, represented generally by bus 408. The bus 408 may include any number of interconnecting buses and bridges depending on the specific implementation of the media packaging and distribution system 102 and the overall design constraints. The bus interface 410 may be configured to provide an interface between the bus 408 and other circuits, such as, the transceiver 412, and external devices, such as the recording client device 114, the distributed communication network 112, the source device 118, the external data source 120, and the plurality of client devices 110.

The transceiver 412 may be configured to provide a communication of the media packaging and distribution system 102 with various other apparatus, such as the Ad decisioning servers 106a, . . . , 106n, the plurality of client devices 110, the external data source 120, and the source device 118, via the network 108. The transceiver 412 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 4 may include software whose corresponding code may be executed by at least one processor, for across multiple processing environments. For example, the DACIS 103, the shared media session system 105, the CPDS 107, and the external storage system 109 may include software that may be executed across a single or multiple processing environments.

In an aspect of the disclosure, the processor 404, the non-transitory computer-readable medium 406, or a combination of both may be configured or otherwise specially programmed to execute the operations or functionality of the DACIS 103, the shared media session system 105, the CPDS 107, and the external storage system 109, or various other components described herein, as described with respect to FIGS. 1A to 1C.

Various embodiments of the disclosure comprise the media packaging and distribution system 102 that may be configured to establish a shared media session for one or more client devices, such as the plurality of client devices 110. The media packaging and distribution system 102 may comprise, for example, the DACIS 103, the shared media session system 105, the CPDS 107, and the external storage system 109. In accordance with an embodiment, one or more processors in the shared media session system 105 may be configured to establish a shared media session. The shared media session may include a disparate live media output stream scheduled by the first client device 110a to start at a defined timestamp. The disparate live media output stream may be played back on one of the first client device 110a or the plurality of client devices 110 that comprises the first client device 110a and one or more second client devices 110b, . . . , 110n. The plurality of client devices 110 may join the shared media session through the distributed communication network 112. During the shared media session, event data and media among the plurality of client devices 110 in the shared media session may be synchronized through the distributed communication network 112 based on one or more criteria. The one or more processors in the shared media session system 105 may be further configured to receive the event data and media corresponding to the shared media session and previous shared media sessions from the recording client device 114 communicably coupled to the distributed communication network 112. The one or more processors in the shared media session system 105 may be further configured to generate a persistent record of received event data and media corresponding to the shared media session and previous shared media sessions until the shared media session is terminated by at least one of the first client device 110a or by abandonment of the distributed communication network 112 by the first client device 110a and by the one or more second client devices 110b, . . . , 110n.

In accordance with an embodiment, the shared media session system 105 may be configured to define the shared media session based on one or more characteristics. The one or more characteristics may comprise a count of client devices 110 that participate in the shared media session and interact with the disparate live media output stream, a selection of media content based on which a disparate live media output stream manifest is generated, a first flag that indicates the shared media session is discoverable by the one or more second client devices 110b, . . . , 110n via the system, and a second flag that indicates the shared media session is to be recorded. In accordance with an embodiment, the media content may be selected by the user associated with the first client device 110a from a list of existing and referenced media content provided by the one or more processors, or submitted by the user from an external source. The one or more processors in the shared media session system 105 may be further configured to determine that the shared media session is to be recorded based on the second flag during the establishment of the shared media session or after the establishment of the shared media session.

In accordance with an embodiment, the distributed communication network 112 may be established by the first client device 110a. A client identifier and device address may be communicated to the one or more processors in the shared media session system 105 by the first client device 110a. In accordance with another embodiment, the established distributed communication network 112 may be joined by the recording client device 114, via the second peer-to-peer module 130. The event data and the media exchanges between client devices from the plurality of client devices 110 during the playback of the disparate live media output stream may be recorded by the recording client device 114.

In accordance with an embodiment, the persistent record may exclude the disparate live media output stream selected for the playback in the shared media session. Each event data and media exchange may include playhead time of the playback of the disparate live media output stream, and real-time of an event. The event data and media exchange may be synchronized with the playback of the disparate live media output stream in the shared media session. The one or more processors in the shared media session system 105 may be configured to persist the shared media session until the shared media session is terminated by the first client device 110a.

In accordance with an embodiment, the shared media session is a single-participant shared media session that comprises the first client device 110a and is initiated by the first client device 110a. In accordance with another embodiment, the shared media session is a multi-participant shared media session that comprises the plurality of client devices 110, and is initiated by the first client device 110a. The distributed communication network 112 that comprises the plurality of client devices 110 may correspond to a peer-to-peer network. The plurality of client devices 110 may be configured to discover and join the distributed communication network 112 by the shared media session, via the corresponding first peer-to-peer module 128. The shared media session may be advertised explicitly and selected by the first client device 110a via an invitation or a shared universal resource locator, via an external advertisement service via a universal resource locator or an identifier, or within context of a group of shared media sessions discovered within the system.

In accordance with an embodiment, the distributed communication network 112 may be established by the first client device 110a in an instance in which the first client device 110a is a first participant. An identifier may be established for each participant. The one or more processors in the shared media session system 105 may be configured to receive and store an identifier from the first client device 110a. The identifier may be discovered by the one or more second client devices 110b, . . . , 110n in the shared media session. The one or more processors in the shared media session system 105 may be further configured to receive and store identifiers for remaining client devices of the shared media session. The identifier may be discovered by the one or more second client devices 110b, . . . , 110c in the shared media session. The distributed communication network 112 may be established directly between client devices from the plurality of client devices 110. Each client device within the distributed communication network 112 may be identified based on corresponding identifier. The event data and media may be shared between client devices from the plurality of client devices 110 through the distributed communication network 112. In accordance with an embodiment, the media may comprise audio data and video data. The audio data may include at least an external audio media, an audio recorded from a microphone, or an application-specific audio resource. The video data may include at least an external video media, a video recorded from a participant camera, or an application-specific video resource. The event data may include a first user interaction with disparate live media output stream that pauses video for the plurality of client devices 110, plays rewinds, fast-forward or seek media for the plurality of client devices 110, or a second user interaction with another user. The event data may further include a first broadcast notification of network state of the plurality of client devices 110 that is one of connected, disconnected or sending data, or a second broadcast notification of application state of the plurality of client devices 110 that is one of a muted audio, an invoked interactive element, a completion of the invoked interactive element, a change in user application configuration, an update in playback state of the disparate live media output stream, a change in the playback state of the disparate live media output stream, addition of new client devices or removal of existing client devices. The event data may further include a combination of real time and media playhead time to maintain event sequence.

In accordance with an embodiment, a schedule of the shared media session within the system indicates a start of the disparate live media output stream at the defined timestamp and date. The defined timestamp and date may correspond with at least one of a live event streamed in the disparate live media output stream or pre-encoded media assets streamed in the disparate live media output stream. The one or more second client devices 110b, . . . , 110n may join or do not join the shared media session based on coordination with the defined timestamp and date in the schedule. In accordance with an embodiment, the one or more processors in the shared media session system 105 may be configured to store the persistent record corresponding to the shared media session. The one or more criteria may be defined based on a level of synchronization accuracy corresponding to type of media content in the disparate live media output stream, view of same position in the disparate live media output stream by each client device concurrently, a combination of one or more streaming protocols and one or more control flow protocols utilized for synchronization, usage of a synchronizing client device of the plurality of client devices 110 to send playhead time relative to a calculated offset of time of another client device, application of constraints on a live window during playback of the disparate live media output stream and size of media segments in the disparate live media output stream such that a variability of different playback positions is limited to an accepted value, or a combination thereof. In accordance with an embodiment, the generated persistent record may comprise a persistent audio data exchanged between client devices from the plurality of client devices 110 on the distributed communication network 112, a persistent video data exchanged between client devices from the plurality of client devices 110 on the distributed communication network 112, a persistent event data exchanged between client devices from the plurality of client devices 110 on the distributed communication network 112, and/or time of the event data, audio data, and/or video data in accordance with real time or time of the disparate live media output stream.

In accordance with an embodiment, the one or more processors may be further configured to communicate the generated persistent record to the external storage system 109, retrieve the persistent record from the external storage system 109, recreate the shared media session at a future time based on the event data and media in the retrieved persistent record, and distribute the retrieved persistent record through the CPDS 107. The CPDS 107 may be configured to transcode from an existing, persistent and stored record from a first encoding format to a second encoding format. The one or more processors may be further configured to coordinate the recording of the shared media session with start of shared media session or according to number of the plurality of client devices 110 in the distributed communication network 112. The one or more processors may be further configured to define a content identifier for the shared media session, and receive a request from a third client device for the persistent record of the received event data and media corresponding to the shared media session and previous shared media sessions. The third client device may be one of the distributed communication network 112 or external to the distributed communication network 112.

In accordance with an embodiment, the one or more processors may be further configured to augment an existing disparate live media output stream to generate a new disparate live media output stream. The augmentation may be based on the event data and media corresponding to the persistent record of the shared media session. The new disparate live media output stream may comprises a plurality of distinct audio channels based on an audio interaction of one of the plurality of client devices 110, and/or an application state of one of the plurality of client devices 110. The new disparate live media output stream may comprise a multiplexed audio that includes an audio interaction of one of the plurality of client devices 110, or an application state of one of the plurality of client devices 110, and/or an audio of the existing disparate live media output stream. The recording client device 114 may record the event data and media exchanges between client devices of the plurality of client devices 110 during playback of the existing disparate live media output stream.

The persistent record may exclude the existing disparate live media output stream selected for the shared media session playback. Each event data and media exchange may include playhead time of the playback of the disparate live media output stream, and real-time of event. The event data and media exchange may be synchronized with the playback of the disparate live media output stream in the shared media session. The persistent record of the event data and media exchanges may be synchronized with the playback of the existing disparate live media output stream of the shared media session and transcoded and distributed as the new disparate live media output stream.

In accordance with an embodiment, the one or more processors in the recording client device 114 may be configured to join the distributed communication network 112 associated with the shared media session established by the shared media session system 105, via the second peer-to-peer module 130. A disparate live media output stream may be played back on one of the first client device 110a or the plurality of client devices 110 that comprises the first client device 110a and one or more second client devices 110b, . . . , 110n. The event data and media among the plurality of client devices 110 may be synchronized in the shared media session through the distributed communication network 112 based on one or more criteria. The one or more processors in the recording client device 114 may be further configured to record the event data and media exchanged between client devices from the plurality of client devices 110 on the distributed communication network 112 during the playback of the disparate live media output stream in the shared media session. The one or more processors in the recording client device 114 may be further configured to transmit the recorded event data and media to the external storage system 109. The one or more processors in the recording client device 114 may be further configured to cease the recording of the event data and media based on abandonment of the distributed communication network 112 by the plurality of client devices 110. The one or more processors in the recording client device 114 may be further configured to generate an alert for the shared media session system 105 that establishes the shared media session to terminate the shared media session. The user associated with the first client device 110a may initiate an establishment of a single-participant or a multi-participant shared media session. The user may further schedule the disparate live media output stream and initiates the playback of the disparate live media output stream.

Various embodiments of the disclosure may provide a computer-readable medium, such as the non-transitory computer-readable medium 406, having stored thereon, computer implemented instruction that when executed by the processor 404 causes the media packaging and distribution system 102 to execute operations for establishing a shared media session for one or more client devices. In accordance with an embodiment, the processor 404 causes the media packaging and distribution system 102 to execute operations to establish a shared media session. The shared media session may include a disparate live media output stream scheduled by the first client device 110a to start at a defined timestamp. The disparate live media output stream may be played back on one of the first client device 110a or the plurality of client devices 110 that comprises the first client device 110a and one or more second client devices 110b, . . . , 110n. The plurality of client devices 110 may join the shared media session through the distributed communication network 112, via the corresponding first peer-to-peer module 128. The processor 404 further causes the media packaging and distribution system 102 to execute operations to synchronize event data and media among the plurality of client devices 110 in the shared media session through the distributed communication network 112 based on one or more criteria. The processor 404 further causes the media packaging and distribution system 102 to execute operations to receive the event data and media corresponding to the shared media session and previous shared media sessions from the recording client device 114 communicably coupled to the distributed communication network 112. The processor 404 further causes the media packaging and distribution system 102 to execute operations to generate a persistent record of received event data and media corresponding to the shared media session and previous shared media sessions until the shared media session is terminated by at least one of the first client device 110a or by abandonment of the distributed communication network 112 by the first client device 110a and by the one or more second client devices 110b, . . . , 110n.

Modern streaming protocols may also support delivery of disparate live media output stream to multiple client devices. Accordingly, short content media segments, facilitated by such modern streaming protocols, are made available as soon as they are created. In some streaming protocols, each new segment is added to the manifest of the disparate live media output stream while in others the media player at the client devices are provided necessary information to calculate the next live segment. In the latter case, a signal in the disparate live media output stream itself is used to inform the media player when the media player should reinspect the manifest for a change in content (media or other) in the disparate live media output stream. The manifest and/or the media segment may further include additional information to facilitate the media player to transition smoothly between media content from different sources. This may be used for creating a playlist of multiple disparate live media output streams, or for interrupting a disparate live media output stream with advertising and then resuming the disparate live media output stream.

Because the disparate live media output stream itself does not need to be processed beyond the initial creation of the live input streams and pre-encoded media assets prepared for web distribution, it is extremely inexpensive to provide such branches. It may be based solely on the cost to manipulate the manifests that provide execution instructions for the media players in the client devices. Further, targeted ad insertion on a per client basis may also be supported through the insertion of ad tags in the generated disparate live media output stream manifest and may further leverage the processing power of the individual client devices to insert targeted channel graphics and overlay advertisements and promotions.

The shared media session system 105 in the media packaging and distribution system 102 may be configured to construct shared media sessions and facilitate participants of a given shared media session with constructing a peer-to-peer network between participants. As an extension to the CPDS 107, the media packaging and distribution system 102 may be configured to provide additional capabilities that may allow an explicit channel creation by a user for a single view, an explicit channel creation by a user for group viewing and interactions, and an explicit channel creation by a user for group viewing with accurate synchronization and extended interactivity.

For example, in accordance with the explicit channel creation by the user for the single view, the user may want to play all the vacation series of a thanksgiving movie back-to-back. In such case, the user may schedule the vacation series, play the vacation series, and view the vacation series on a channel. The channel may be scheduled in such a manner that manifests, queues, graphical treatment (for example overlays), promotional content in the beginning, ad breaks or no ad breaks in the middle may be maintained by the media packaging and distribution system 102.

In another example, in accordance with the explicit channel creation by the user for group viewing, the user may be schedule the channel and joined by other viewers at the same location to watch the disparate live media output stream being played on the client device associated with the user. However, other viewers are disconnected viewers and do not actively participate in the session corresponding to the channel creation.

In another example, in accordance with the explicit channel creation by the user for group viewing, for example a sporting event, with accurate synchronization and extended interactivity, the user may schedule the channel and also invite the other viewers to watch the same frame simultaneously. However, in certain cases, for example the Oscars event, the synchronization may not be tightly coupled but extended interactivity is provided between the user and the other viewers. In both the embodiments, the same disparate live media output stream may be displayed on the devices associated with the other viewers. Further, during watching the same disparate live media output stream, the user may have an option to interact with the other viewers.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations.

As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for establishing a shared media session for one or more client devices.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors configured to:
establish a shared media session that includes a disparate live media output stream scheduled by a first client device to start at a defined timestamp,
wherein the disparate live media output stream is played back on one of the first client device or a plurality of client devices that comprises the first client device and one or more second client devices, and
wherein the plurality of client devices join the shared media session through a distributed communication network;
synchronize event data and media among the plurality of client devices in the shared media session through the distributed communication network based on one or more criteria;
receive the event data and media corresponding to the shared media session and previous shared media sessions from a recording client device communicably coupled to the distributed communication network;
generate a persistent record of the event data and media corresponding to the shared media session and the previous shared media sessions until the shared media session is terminated by at least one of the first client device or by abandonment of the distributed communication network by the first client device and by the one or more second client devices; and
generate a new disparate live media output stream with multiple distinct channels based on augmentation of an interaction from a user on one or more actions in the shared media session,
wherein the persistent record of the event data and media is synchronized with the playback of the disparate live media output stream in the shared media session as the new disparate live media output stream with multiple distinct channels.

2. The system according to claim 1, wherein the one or more processors are further configured to define the shared media session based on one or more characteristics, and
wherein the one or more characteristics comprise a count of client devices that participate in the shared media session and interact with the disparate live media output stream, a selection of media content based on which a disparate live media output stream manifest is generated, a first flag that indicates the shared media session is discoverable by the one or more second client devices via the system, and a second flag that indicates the shared media session is to be recorded.

3. The system according to claim 2, wherein the media content is selected by a user associated with the first client device from a list of existing and referenced media content provided by the one or more processors, or submitted by the user from an external source.

4. The system according to claim 2, wherein the one or more processors are further configured to determine that the shared media session is to be recorded based on the second flag during the establishment of the shared media session or after the establishment of the shared media session.

5. The system according to claim 4, wherein the distributed communication network is established by the first client device, and
wherein a client identifier and device address is communicated to the one or more processors by the first client device.

6. The system according to claim 4, wherein the distributed communication network is joined by the recording client device, and
wherein event data and media exchanges between the plurality of client devices during a playback of the disparate live media output stream is recorded by the recording client device.

7. The system according to claim 1, wherein the persistent record excludes the disparate live media output stream selected for playback in the shared media session,
wherein each event data and media exchange includes playhead time of the playback of the disparate live media output stream, and real-time of an event, and
wherein the event data and media exchange are synchronized with the playback of the disparate live media output stream in the shared media session.

8. The system according to claim 1, wherein the shared media session is a single-participant shared media session that comprises the first client device and is initiated by the first client device.

9. The system according to claim 1, wherein the shared media session is a multi-participant shared media session that comprises the plurality of client devices, and is initiated by the first client device, and
wherein the distributed communication network that comprises the plurality of client devices corresponds to a peer-to-peer network.

10. The system according to claim 9, wherein the plurality of client devices discovers and joins the distributed communication network by the shared media session.

11. The system according to claim 9, wherein the shared media session is advertised explicitly and selected by the first client device via an invitation or a shared universal resource locator, via an external advertisement service via a universal resource locator or an identifier, or within context of a group of shared media sessions discovered within the system.

12. The system according to claim 9, wherein the distributed communication network is established by the first client device in an instance in which the first client device is a first participant, and
wherein an identifier is established for each participant.

13. The system according to claim 12, wherein the one or more processors are further configured to receive and store an identifier from the first client device, and
wherein the identifier is discovered by the one or more second client devices in the shared media session.

14. The system according to claim 12, wherein the one or more processors are further configured to receive and store identifiers for remaining client devices of the shared media session, and
wherein the identifiers are discovered by the one or more second client devices in the shared media session.

15. The system according to claim 13, wherein the distributed communication network is established directly between the plurality of client devices,
wherein each client device within the distributed communication network is identified based on corresponding identifier, and
wherein the event data and media is shared between the plurality of client devices through the distributed communication network.

16. The system according to claim 1, wherein the media comprises audio data and video data, wherein the audio data includes at least an external audio media, an audio recorded from a microphone, or an application-specific audio resource,
wherein the video data includes at least an external video media, a video recorded from a participant camera, or an application-specific video resource,
wherein the event data includes a first user interaction with disparate live media output stream that pauses video for the plurality of client devices, plays rewinds, fast-forward or seek media for the plurality of client devices, or a second user interaction with another user,
wherein the event data further includes a first broadcast notification of network state of the plurality of client devices that is one of connected, disconnected or sending data, or a second broadcast notification of application state of the plurality of client devices that is one of a muted audio, an invoked interactive element, a completion of the invoked interactive element, a change in user application configuration, an update in playback state of the disparate live media output stream, a change in the playback state of the disparate live media output stream, addition of new client devices or removal of existing client devices, and
wherein the event data further includes a combination of real time and media playhead time to maintain event sequence.

17. The system according to claim 1, wherein a schedule of the shared media session within the system indicates a start of the disparate live media output stream at the defined timestamp and date,
wherein the defined timestamp and date corresponds with at least one of a live event streamed in the disparate live media output stream or pre-encoded media assets streamed in the disparate live media output stream, and
wherein the one or more second client devices join or do not join the shared media session based on coordination with the defined timestamp and date in the schedule.

18. The system according to claim 1, wherein the one or more processors are further configured to store the persistent record corresponding to the shared media session.

19. The system according to claim 1, wherein one or more criteria is defined based on a level of synchronization accuracy corresponding to type of media content in the disparate live media output stream, view of same position in the disparate live media output stream by each client device concurrently, a combination of one or more streaming protocols and one or more control flow protocols utilized for synchronization, usage of a synchronizing client device of the plurality of client devices to send playhead time relative to a calculated offset of time of another client device, application of constraints on a live window during playback of the disparate live media output stream and size of media segments in the disparate live media output stream such that a variability of different playback positions is limited to an accepted value, or a combination thereof.

20. The system according to claim 1, wherein the persistent record comprises a persistent audio data exchanged between the plurality of client devices on the distributed communication network, a persistent video data exchanged between the plurality of client devices on the distributed communication network, a persistent event data exchanged between the plurality of client devices on the distributed communication network, and/or time of the event data, audio data, and/or video data in accordance with real time or time of the disparate live media output stream.

21. The system according to claim 1, wherein the one or more processors are further configured to:
communicate the persistent record to an external storage system;
retrieve the persistent record from the external storage system;
recreate the shared media session at a future times based on the event data and media in the retrieved persistent record; and
distribute the retrieved persistent record through a content packaging and distribution system.

22. The system according to claim 21, wherein the content packaging and distribution system in the system is configured to transcode from an existing, persistent and stored record from a first encoding format to a second encoding format.

23. The system according to claim 1, wherein the one or more processors are further configured to coordinate the recording of the shared media session with start of shared media session or according to number of the plurality of client devices in the distributed communication network.

24. The system according to claim 1, wherein the one or more processors are further configured to:
define a content identifier for the shared media session; and
receive a request from a third client device for the persistent record of the event data and media corresponding to the shared media session and previous shared media sessions,
wherein the third client device is one of in the distributed communication network or external to the distributed communication network.

25. The system according to claim 1, wherein the one or more processors are further configured to augment an existing disparate live media output stream to generate a new disparate live media output stream, and
wherein the augmentation is based on the event data and media corresponding to the persistent record of the shared media session.

26. The system according to claim 25, wherein the new disparate live media output stream comprises a plurality of distinct audio channels based on an audio interaction of one of the plurality of client devices, and/or an application state of one of the plurality of client devices.

27. The system according to claim 25, wherein the new disparate live media output stream comprises a multiplexed audio that includes an audio interaction of one of the plurality of client devices, or an application state of one of the plurality of client devices, and/or an audio of the existing disparate live media output stream.

28. The system according to claim 25, wherein the recording client device records the event data and media exchanges between the plurality of client devices during playback of the existing disparate live media output stream,
wherein the persistent record excludes the existing disparate live media output stream selected for the playback,
wherein each event data and media exchange includes playhead time of the playback of the disparate live media output stream, and real-time of event, and
wherein the event data and media exchange are synchronized with the playback of the disparate live media output stream in the shared media session.

29. The system according to claim 28, wherein the persistent record of the event data and media exchanges are synchronized with the playback of the existing disparate live media output stream of the shared media session and transcoded and distributed as the new disparate live media output stream.

30. A recording client device, comprising:
one or more processors configured to:
join a distributed communication network associated with a shared media session established by a shared media session system,
wherein a disparate live media output stream is played back on one of a first client device or a plurality of client devices that comprises the first client device and one or more second client devices, and
wherein event data and media among the plurality of client devices is synchronized in the shared media session through the distributed communication network based on one or more criteria;
record the event data and media exchanged between the plurality of client devices on the distributed communication network during a playback of the disparate live media output stream in the shared media session,
wherein a new disparate live media output stream with multiple distinct channels is generated based on augmentation of an interaction from a user on one or more actions in the shared media session,
wherein the record of the event data and media is synchronized with the playback of the disparate live media output stream in the shared media session as the new disparate live media output stream with multiple distinct channels;
transmit the event data and media to an external storage system;
cease the recording of the event data and media based on abandonment of the distributed communication network by the plurality of client devices; and
generate an alert for a system that establishes the shared media session to terminate the shared media session.

31. The recording client device according to claim 30, wherein a user associated with the first client device initiates an establishment of a single-participant or a multi-participant shared media session, and
wherein the user schedules the disparate live media output stream and initiates the playback of the disparate live media output stream.

32. A method, comprising:
establishing, by one or more processors, a shared media session that includes a disparate live media output stream scheduled by a first client device to start at a defined timestamp,
wherein the disparate live media output stream is played back on one of the first client device or a plurality of client devices that comprises the first client device and one or more second client devices, and
wherein the plurality of client devices join the shared media session through a distributed communication network;
synchronizing, by the one or more processors, event data and media among the plurality of client devices in the shared media session through the distributed communication network based on one or more criteria;
receiving, by the one or more processors, the event data and media corresponding to the shared media session and previous shared media sessions from a recording client device communicably coupled to the distributed communication network;
generating, by the one or more processors, a persistent record of the event data and media corresponding to the shared media session and the previous shared media sessions until the shared media session is terminated by at least one of the first client device or by abandonment of the distributed communication network by the first client device and by the one or more second client devices; and
generating a new disparate live media output stream with multiple distinct channels based on augmentation of an interaction from a user on one or more actions in the shared media session,
wherein the persistent record of the event data and media is synchronized with the playback of the disparate live media output stream in the shared media session as the new disparate live media output stream with multiple distinct channels.

33. The method according to claim 32, further comprising defining, by the one or more processors, the shared media session based on one or more characteristics, and
wherein the one or more characteristics comprise a count of client devices that participate in the shared media session and interact with the disparate live media output stream, a selection of media content based on which a disparate live media output stream manifest is generated, a first flag that indicates the shared media session is discoverable by the one or more second client devices via the one or more processors, and a second flag that indicates the shared media session is to be recorded.

34. The method according to claim 33, wherein the media content is selected by a user associated with the first client device from a list of existing and referenced media content provided by the one or more processors, or submitted by the user from an external source.

35. The method according to claim 33, further comprising determining, by the one or more processors, that the shared media session is to be recorded based on the second flag during the establishment of the shared media session or after the establishment of the shared media session.

36. The method according to claim 35, wherein the distributed communication network is established by the first client device, and
   wherein a client identifier and device address is communicated to the one or more processors by the first client device.

37. The method according to claim 35, wherein the distributed communication network is joined by the recording client device, and
   wherein event data and media exchanges between the plurality of client devices during a playback of the disparate live media output stream is recorded by the recording client device.

38. The method according to claim 32, wherein the persistent record excludes the disparate live media output stream selected for a playback in the shared media session,
   wherein each event data and media exchange includes playhead time of the playback of the disparate live media output stream, and real-time of an event, and
   wherein the event data and media exchange are synchronized with the playback of the disparate live media output stream in the shared media session.

39. The method according to claim 32, wherein the shared media session is a single-participant shared media session that comprises the first client device and is initiated by the first client device.

40. The method according to claim 32, wherein the shared media session is a multi-participant shared media session that comprises the plurality of client devices, and is initiated by the first client device, and
   wherein the distributed communication network that comprises the plurality of client devices corresponds to a peer-to-peer network.

41. The method according to claim 40, wherein the plurality of client devices discovers and joins the distributed communication network by the shared media session.

42. The method according to claim 40, wherein the shared media session is advertised explicitly and selected by the first client device via an invitation or a shared universal resource locator, via an external advertisement service via a universal resource locator or an identifier, or within context of a group of shared media sessions discovered within a shared media session system.

43. The method according to claim 40, wherein the distributed communication network is established by the first client device in an instance in which the first client device is a first participant, and
   wherein an identifier is established for each participant.

44. The method according to claim 43, further comprising receiving and storing, by the one or more processors, an identifier from the first client device, and
   wherein the identifier is discovered by the one or more second client devices in the shared media session.

45. The method according to claim 43, further comprising receiving and storing, by the one or more processors, identifiers for remaining client devices of the shared media session, and
   wherein the identifiers are discovered by the one or more second client devices in the shared media session.

46. The method according to claim 45, wherein the distributed communication network is established directly between the plurality of client devices,
   wherein each client device within the distributed communication network is identified based on corresponding identifier, and
   wherein the event data and media is shared between the plurality of client devices through the distributed communication network.

47. The method according to claim 32, wherein the media comprises audio data and video data, wherein the audio data includes at least an external audio media, an audio recorded from a microphone, or an application-specific audio resource,
   wherein the video data includes at least an external video media, a video recorded from a participant camera, or an application-specific video resource,
   wherein the event data includes a first user interaction with disparate live media output stream that pauses video for the plurality of client devices, plays rewinds, fast-forward or seek media for the plurality of client devices, or a second user interaction with another user,
   wherein the event data further includes a first broadcast notification of network state of the plurality of client devices that is one of connected, disconnected or sending data, or a second broadcast notification of application state of the plurality of client devices that is one of a muted audio, an invoked interactive element, a completion of the invoked interactive element, a change in user application configuration, an update in playback state of the disparate live media output stream, a change in the playback state of the disparate live media output stream, addition of new client devices or removal of existing client devices, and
   wherein the event data further includes a combination of real time and media playhead time to maintain event sequence.

48. The method according to claim 32, wherein a schedule of the shared media session within a shared media session system indicates a start of the disparate live media output stream at the defined timestamp and date,
   wherein the defined timestamp and date corresponds with at least one of a live event streamed in the disparate live media output stream or pre-encoded media assets streamed in the disparate live media output stream, and
   wherein the one or more second client devices join or do not join the shared media session based on coordination with the defined timestamp and date in the schedule.

49. The method according to claim 32, further comprising storing, by the one or more processors, the persistent record corresponding to the shared media session.

50. The method according to claim 32, wherein one or more criteria is defined based on a level of synchronization accuracy corresponding to type of media content in the disparate live media output stream, view of same position in the disparate live media output stream by each client device concurrently, a combination of one or more streaming protocols and one or more control flow protocols utilized for synchronization, usage of a synchronizing client device of the plurality of client devices to send playhead time relative to a calculated offset of time of another client device, application of constraints on a live window during playback of the disparate live media output stream and size of media segments in the disparate live media output stream such that a variability of different playback positions is limited to an accepted value, or a combination thereof.

51. The method according to claim 32, wherein the persistent record comprises a persistent audio data exchanged between the plurality of client devices on the distributed communication network, a persistent video data exchanged between the plurality of client devices on the distributed communication network, a persistent event data exchanged between the plurality of client devices on the distributed communication network, and/or time of the event data, audio data, and/or video data in accordance with real time or time of the disparate live media output stream.

52. The method according to claim 32, further comprising:
communicating, by the one or more processors, the persistent record to an external storage system;
retrieving, by the one or more processors, the persistent record from the external storage system;
recreating, by the one or more processors, the shared media session at a future time based on the event data and media in the retrieved persistent record; and
distributing, by the one or more processors, the retrieved persistent record through a content packaging and distribution system.

53. The method according to claim 52, wherein the content packaging and distribution system configured to transcode an existing, persistent and stored record from a first encoding format to a second encoding format.

54. The method according to claim 32, further comprising coordinating, by the one or more processors, the recording of the shared media session with start of shared media session or according to number of the plurality of client devices in the distributed communication network.

55. The method according to claim 32, further comprising:
defining, by the one or more processors, a content identifier for the shared media session; and
receiving, by the one or more processors, a request from a third client device for the persistent record of the event data and media corresponding to the shared media session and previous shared media sessions,
wherein the third client device is one of in the distributed communication network or external to the distributed communication network.

56. The method according to claim 32, further comprising augmenting, by the one or more processors, an existing disparate live media output stream to generate a new disparate live media output stream, and
wherein the augmentation is based on the event data and media corresponding to the persistent record of the shared media session.

57. The method according to claim 56, wherein the new disparate live media output stream comprises a plurality of distinct audio channels based on an audio interaction of one of the plurality of client devices, and/or an application state of one of the plurality of client devices.

58. The method according to claim 56, wherein the new disparate live media output stream comprises a multiplexed audio that includes an audio interaction of one of the plurality of client devices, or an application state of one of the plurality of client devices, and/or an audio of the existing disparate live media output stream.

59. The method according to claim 56, wherein the recording client device records the event data and media exchanges between the plurality of client devices during playback of the existing disparate live media output stream,
wherein the persistent record excludes the existing disparate live media output stream selected for the playback,
wherein each event data and media exchange includes playhead time of the playback of the disparate live media output stream, and real-time of event, and
wherein the event data and media exchange are synchronized with the playback of the disparate live media output stream in the shared media session.

60. The method according to claim 59, wherein the persistent record of the event data and media exchanges are synchronized with the playback of the existing disparate live media output stream of the shared media session and transcoded and distributed as the new disparate live media output stream.

61. A recording method, comprising:
joining, by one or more processors, a distributed communication network associated with a shared media session established by a shared media session system,
wherein a disparate live media output stream is played back on one of a first client device or a plurality of client devices that comprises the first client device and one or more second client devices, and
wherein event data and media among the plurality of client devices is synchronized in the shared media session through the distributed communication network based on one or more criteria;
recording, by the one or more processors, the event data and media exchanged between the plurality of client devices on the distributed communication network during a playback of the disparate live media output stream in the shared media session,
wherein a new disparate live media output stream with multiple distinct channels is generated based on augmentation of an interaction from a user on one or more actions in the shared media session,
wherein the record of the event data and media is synchronized with the playback of the disparate live media output stream in the shared media session as the new disparate live media output stream with multiple distinct channels;
transmitting, by the one or more processors, the event data and media to an external storage system;
ceasing, by the one or more processors, the recording of the event data and media based on abandonment of the distributed communication network by the plurality of client devices; and
generating, by the one or more processors, an alert for a system that establishes the shared media session to terminate the shared media session.

62. The recording method according to claim 61, wherein a user associated with the first client device initiates an establishment of a single-participant or a multi-participant shared media session, and
wherein the user schedules the disparate live media output stream and initiates the playback of the disparate live media output stream.

63. A non-transitory computer-readable medium having stored thereon, computer implemented instruction that when executed by a processor in a computer, causes the computer to execute operations, the operations comprising:
establishing, by one or more processors, a shared media session that includes a disparate live media output stream scheduled by a first client device to start at a defined timestamp,
wherein the disparate live media output stream is played back on one of the first client device or a plurality of client devices that comprises the first client device and one or more second client devices, and wherein the plurality of client devices join the shared media session through a distributed communication network;

synchronizing, by the one or more processors, event data and media among the plurality of client devices in the shared media session through the distributed communication network based on one or more criteria;

receiving, by the one or more processors, the event data and media corresponding to the shared media session and previous shared media sessions from a recording client device communicably coupled to the distributed communication network; and generating, by the one or more processors, a persistent record of the event data and media corresponding to the shared media session and previous shared media sessions until the shared media session is terminated by at least one of the first client device or by abandonment of the distributed communication network by the first client device and by the one or more second client devices; and generate a new disparate live media output stream with multiple distinct channels based on augmentation of an interaction from a user on one or more actions in the shared media session, wherein the persistent record of the event data and media is synchronized with the playback of the disparate live media output stream in the shared media session as the new disparate live media output stream with multiple distinct channels.

* * * * *